C(12) United States Patent
Saruta

(10) Patent No.: US 9,779,329 B2
(45) Date of Patent: Oct. 3, 2017

(54) IMAGE PROCESSING APPARATUS, IMAGE PROCESSING METHOD AND PROGRAM

(71) Applicant: CANON KABUSHIKI KAISHA, Tokyo (JP)

(72) Inventor: Takayuki Saruta, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 69 days.

(21) Appl. No.: 14/940,871

(22) Filed: Nov. 13, 2015

(65) Prior Publication Data
US 2016/0140422 A1 May 19, 2016

(30) Foreign Application Priority Data

Nov. 19, 2014 (JP) ................. 2014-234869

(51) Int. Cl.
*G06K 9/00* (2006.01)
*G06K 9/62* (2006.01)

(52) U.S. Cl.
CPC ....... *G06K 9/6256* (2013.01); *G06K 9/00664* (2013.01); *G06K 9/6217* (2013.01)

(58) Field of Classification Search
CPC ............. G06K 9/00664; G06K 9/6217; G06K 9/6256; G06K 3309/23; G06K 9/6292; G06K 9/6215; G06T 1/0021
USPC ....................................................... 382/159
See application file for complete search history.

(56) References Cited

U.S. PATENT DOCUMENTS

| 6,647,139 | B1* | 11/2003 | Kunii | G06K 9/00791 382/159 |
| 7,856,123 | B2* | 12/2010 | Visani | G06K 9/00275 382/118 |
| 7,995,055 | B1* | 8/2011 | Ma | G06K 9/4604 345/420 |
| 8,270,707 | B2* | 9/2012 | Iwai | G06K 9/00228 382/159 |
| 9,053,383 | B2* | 6/2015 | Hasegawa | G06K 9/4633 |
| 9,367,735 | B2* | 6/2016 | Takenaka | G06K 9/00369 |

FOREIGN PATENT DOCUMENTS

JP  4623387 B2  2/2011

OTHER PUBLICATIONS

Socher et al., "Parsing Natural Scenes and Natural Language with Recursive Neural Networks", Proceedings of the 28th International Conference on Machine Learning, 2011, pp. 1-8.

(Continued)

*Primary Examiner* — Kanjibhai Patel
(74) *Attorney, Agent, or Firm* — Carter, Deluca, Farrell & Schmidt, LLP

(57) ABSTRACT

It aims to accurately identify a class concerning classification of an object for each area of an image. A plurality of subsets are created from a plurality of learning images, and an area discriminator for performing area discrimination of the learning images is learned for each subset created. Then, area discrimination of a plurality of learning evaluation images is performed by using the plurality of learned area discriminators. Further, an integrated identifier is learned based on an area discrimination result performed to the plurality of learning evaluation images and scene information previously associated with each of the plurality of learning evaluation images.

17 Claims, 20 Drawing Sheets

(56) References Cited

OTHER PUBLICATIONS

Kraehenbuehl et al., "Efficient Inference in Fully Connected CRFs with Gaussian Edge Potentials", Advances in Neural Information Processing Systems 24 (NIPS 2011), pp. 1-9.
Felzenszwalb et al., "Efficient Graph-Based Image Segmentation", International Journal of Computer Vision, vol. 59, No. 2, 2004, pp. 1-26.
Lazebnik et al., "Beyond Bags of Features: Spatial Pyramid Matching for Recognizing Natural Scene Categories", Computer Vision and Pattern Recognition, 2006 IEEE Computer Society Conference, pp. 1-8.
Oliva et al., "Modeling the Shape of the Scene: A Holistic Representation of the Spatial Envelope", International Journal of Computer Vision 42(3), 2001, pp. 145-175.
Bay et al., "SURF: Speeded Up Robust Features", Computer Vision and Image Understanding (CVIU), vol. 110, No. 3, 2006, pp. 346-359.

* cited by examiner

FIG. 1
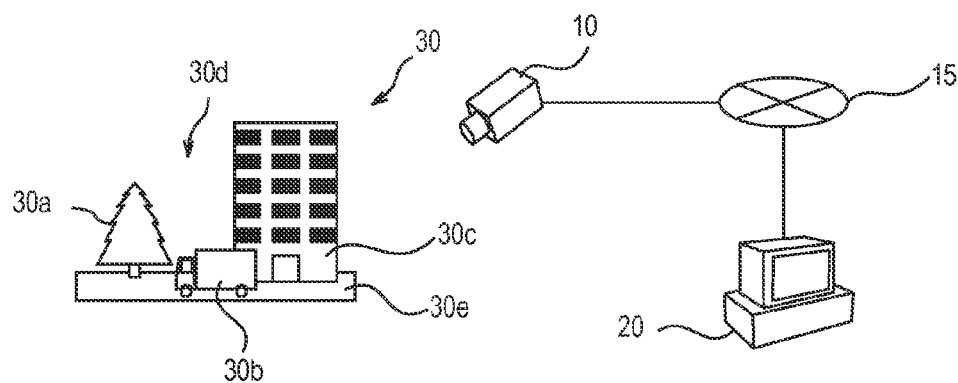
FIG. 2A
FIG. 2B
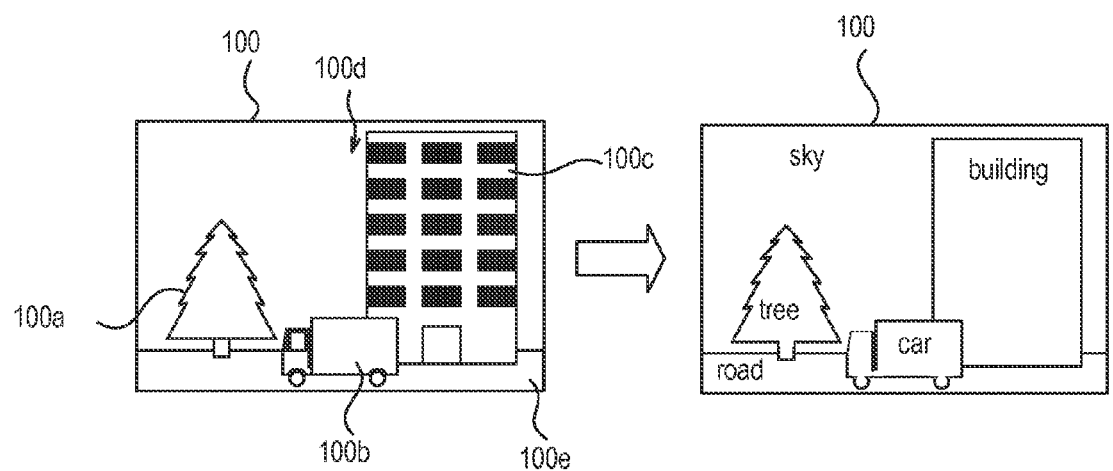

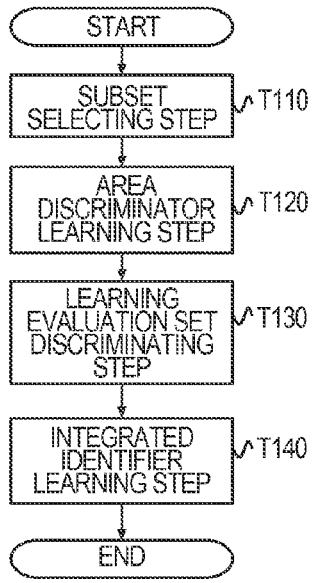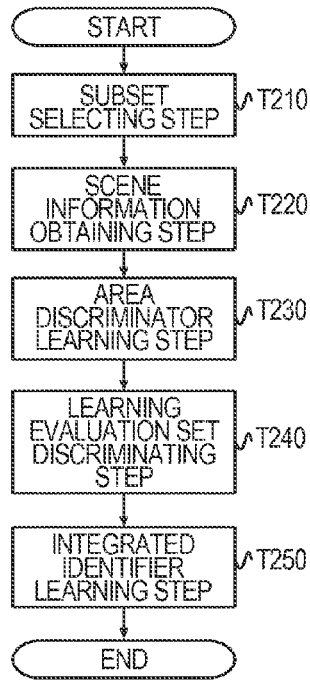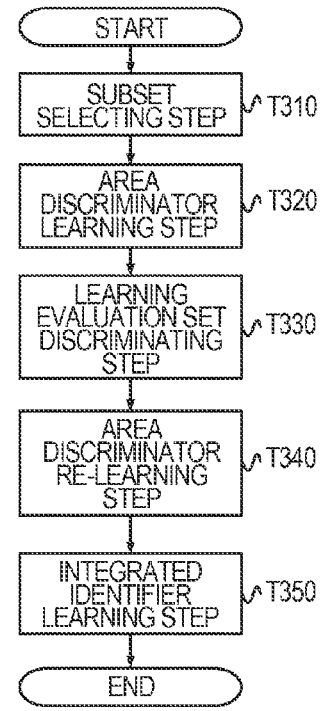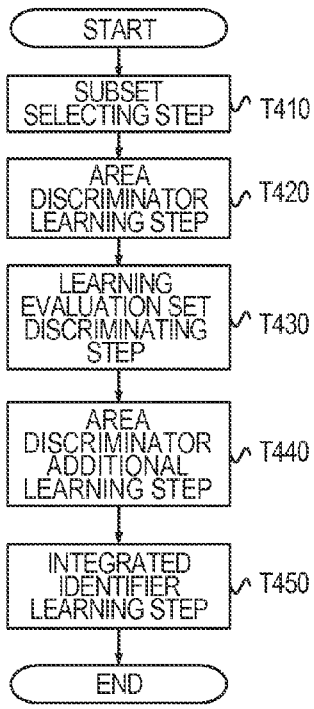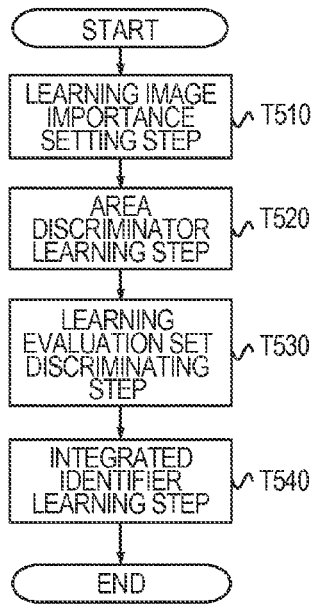

IMAGE PROCESSING APPARATUS, IMAGE PROCESSING METHOD AND PROGRAM

BACKGROUND OF THE INVENTION

Field of the Invention

The present invention relates to an image processing apparatus, an image processing method and a program for achieving the image processing method.

Description of the Related Art

As one of image recognizing methods, there is a method of dividing an image shot and obtained (hereinafter, called a shot image) into a plurality of areas and identifying a class concerning classification of an object for each of the divided areas. In this method, the class for each area is identified based on the feature amount extracted from the image of each area. To appropriately divide the shot image into the areas facilitates many kinds of image processes such as a process to be performed when it is recognized what kind of object or shooting condition (scene) was shot, a process to be performed when image quality is corrected according to an object, and the like.

Here, as the method of dividing an image into areas, R. Socher, "Parsing Natural Scenes and Natural Language with Recursive Neural Networks", International Conference Machine Learning 2011 (Non-Patent Literature 1) discloses the technique of dividing an input image into small areas called superpixels (SPs) based on color information and texture information. In the technique disclosed in the Non-Patent Literature 1, the class of each small area is identified by using an identifier called RNNs (Recursive-Neutral-Networks).

Moreover, P. Krahenbuhl, "Efficient Inference in Fully Connected CRFs with Gaussian Edge Potentials", Neural Information Processing Systems 2011 (Non-Patent Literature 2) discloses the technique of simultaneously performing area division and class identification by using a conditional random field (CRF). In the technique disclosed in the Non-Patent Literature 2, the class of each pixel is identified not only based on the feature extracted from each pixel but also in consideration of class co-occurrence between adjacent pixels. Namely, in the relevant technique, the pixel that it is difficult to recognize alone because the feature thereof is obscure is identified in consideration of the relation with peripheral pixels. More specifically, in the relevant technique, each pixel is set as a node, the energy (unary potential) of the node and the energy (pairwise potential) between the nodes are defined, and the total sum of the defined energies in the whole of an image is minimized. Then, the class label of each pixel by which the energy is minimized is given as an identification result.

On another front, a method called a bagging has been used as an effective method for an image recognizing task in the field of machine learning. Here, the bagging is the method of generating an identifier having higher discrimination accuracy by synthesizing discriminators generated by repeating bootstrap sampling. Besides, a method of performing identification of high discrimination accuracy by generating a large number of identifiers (ensemble identifiers) and integrating the generated identifiers has been studied. Moreover, the technique disclosed in Japanese Patent No. 4623387 achieves high-accuracy identification by generating a large number of ensemble identifiers, selecting the high-accuracy identifiers from among the generated ensemble identifiers, and integrating the selected identifiers.

In addition, each of P. Felzenszwalb, "Efficient Graph-Based Image Segmentation", International Journal of Computer Vision 2004 (Non-Patent Literature 3) and S. Lazebnik, C. Schmid and J. Ponce, "Beyond Bags of Features: Spatial Pyramid Matching for Recognizing Natural Scene Categories", CVPR 2006 (Non-Patent Literature 4) discloses the technique of dividing a shot image into small areas called superpixels (SPs). The Non-Patent Literature 4 also discloses the technique of recognizing a shot scene by using a feature amount called "Spatial Pyramid Matching Kernel". Besides, A. Oliva and A. Torralba, "Modeling the Shape of the Scene: A Holistic Representation of the Spatial Envelope", International Journal of Computer Vision, 2001 (Non-Patent Literature 5) discloses the technique of recognizing a shot scene by using a feature amount called the GIST feature amount. Besides, H. Bay, "SURF: Speeded Up Robust Features", Computing Vision and Image Understanding, 2008 (Non-Patent Literature 6) discloses the technique of using a local feature amount obtained from a learning image.

Here, in the above conventional techniques, one identifier previously generated using the learning image identifies the class of each area in the shot image. That is, the feature amount extracted from each area is input to the one identifier generated by the learning, and the relevant identifier identifies the class of each area by using the input feature amount.

However, in some shooting conditions (scenes), there is a possibility that the class to be normally identified as another class is identified as a similar class, whereas there is a possibility that the class to be normally identified as the similar class is identified as another class. For example, a case where the object is a cloud is assumed. In this case, the cloud shot in the daytime is white, whereas the cloud shot in the afterglow of the sunset is orange because of a reflection caused by the sun. In such situations, the orange cloud image shot in the evening sunlight and, e.g., an orange texture-full wall image shot in the daytime are similar to each other in an image feature space. Consequently, in order to generate an area discriminator (identifier) by using various learning images, for example, if the evening-sunlight image and the orange wall image are simultaneously learned, there is a case where these images are erroneously learned as the similar images. In this case, the identifier erroneously identifies the evening-sunlight image and the orange wall image as the similar images respectively. Then, it becomes difficult to separate and identify the images identified as the similar images.

Therefore, the present invention aims to provide an image processing apparatus, an image processing method and a program which can accurately identify, even for various images of which the shooting conditions (scenes) are different, a class concerning an object classification for each area of the images.

SUMMARY OF THE INVENTION

To achieve such an object, the present invention is characterized by comprising: a creating unit configured to create a plurality of subsets obtained by selecting a part of a plurality of learning images; a learning unit configured to learn an area discriminator for discriminating a class of each area obtained by dividing the learning images, for each subset created by the creating unit; a learning discriminating unit configured to discriminate a class of each area obtained by dividing a plurality of learning evaluation images, by using the plurality of area discriminators learned by the learning unit; and an identification learning unit configured to learn an integrated identifier based on a discrimination result for each area of the plurality of learning evaluation images discriminated by the learning discriminating unit and scene information associated with each of the plurality of learning evaluation images.

Further features of the present invention will become apparent from the following description of exemplary embodiments with reference to the attached drawings.

BRIEF DESCRIPTION OF THE DRAWINGS

FIG. 1 is a diagram illustrating an example of a system configuration which contains an image recognizing apparatus.

FIGS. 2A and 2B are diagrams illustrating an example of an area which is recognized as an image to be identified.

FIGS. 13A, 13B, 13C, 13D and 13E are flow charts respectively indicating learning processes in the first, second, third, fourth and fifth embodiments.

DESCRIPTION OF THE EMBODIMENTS

Figure 3A:
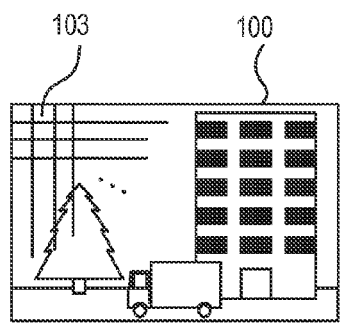
FIGS. 3A, 3B and 3C are diagrams for describing the image to be identified and a concept of identification of each pixel.

Preferred embodiments of the present invention will now be described in detail in accordance with the accompanying drawings.

First Embodiment

FIG. 1 is a diagram illustrating a schematic configuration example of a system having an image processing apparatus. In the system of FIG. 1, a camera 10, the image processing apparatus and an image recognizing apparatus 20, which is one configuration example of realizing an information processing method, are connected with each other through a network 15. Incidentally, the image recognizing apparatus 20 and the camera 10 may be integratedly configured.

The camera 10 shoots images targeted to be image processed by the image recognizing apparatus 20. FIG. 1 illustrates an example that the camera 10 shoots a scene (shooting condition) 30, where a tree 30a, a car 30b, a building 30C, the sky 30d, a road 30e and the like exist within an angle of view (shooting range) as objects. The image recognizing apparatus 20 identifies a class of each area which corresponds to an image of each object within a shot image obtained by a process that the camera 10 imaged (shot) the scene 30. In the following description, an image targeted to be identified when the image recognizing apparatus 20 identifies the class is especially assumed to be called an image to be identified. In case of FIG. 1, the image to be identified is the shot image which was obtained by a process that the camera 10 shot the scene 30. In the present embodiment, the class is a category name (class category name) when classifying images of the objects and the like, which are shot in the image to be identified, for each of the objects. The details of the class will be described later with reference to FIGS. 2A and 2B.

FIG. 2A illustrates an example of an image 100 to be identified which has been input to the image recognizing apparatus 20 due to a fact that the scene 30 of FIG. 1 has been shot by the camera 10. In case of FIG. 2A, the image 100 to be identified is such an image which was constituted by a tree image 100a, a car image 100b, a building image 100c, a sky image 100d, a road image 100e and the like which are objects within the scene 30. When the image 100 to be identified is supplied, the image recognizing apparatus 20 identifies the class for each pixel of that image 100. In this case, the class is a class category names concerning classification of each of objects such as "tree", "car", "building", "sky" "road" or the like as illustrated in FIG. 2B.

Figure 3B:
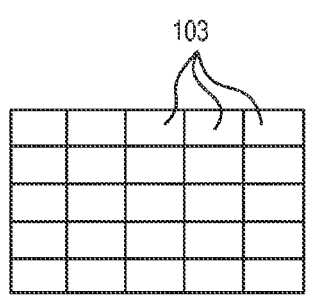
Figure 3C:
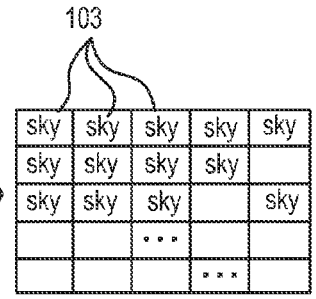

FIGS. 3A to 3C are diagrams illustrating an outline of the image processing when identifying the class of each pixel of the image 100 to be identified. FIG. 3A illustrates the image 100 to be identified, and respective portions partitioned by latticed lines located at an upper left area respectively correspond to pixels. FIG. 3B illustrates the respective pixels located at the upper left area of the image 100 to be identified illustrated in FIG. 3A by enlarging them. FIG. 3C illustrates a state that classes are assigned for each of the respective pixels in FIG. 3B. Here, the respective pixels located at an upper left area in FIG. 3A constitute the sky image 100d in the image 100 to be identified illustrated in FIG. 2A. Therefore, the image recognizing apparatus 20 assigns classes, for example, named as "sky" for the respective pixels in FIG. 3B as the class category name as illustrated in FIG. 3C. Similarly, the image recognizing apparatus 20 assigns classes for all the pixels of the image 100 to be identified. Accordingly, for example, as in FIG. 2B, the respective pixels of the image 100 to be identified are classified into the category name concerning classification of each of the objects such as "tree", "car", "building", "sky", "road" and the like. In this manner, the image recognizing apparatus 20 realizes the area division of the image 100 to be identified by performing the area division of the image in each of the classes after assigning the classes for each of the respective pixels of the image 100 to be identified.

Figure 4:
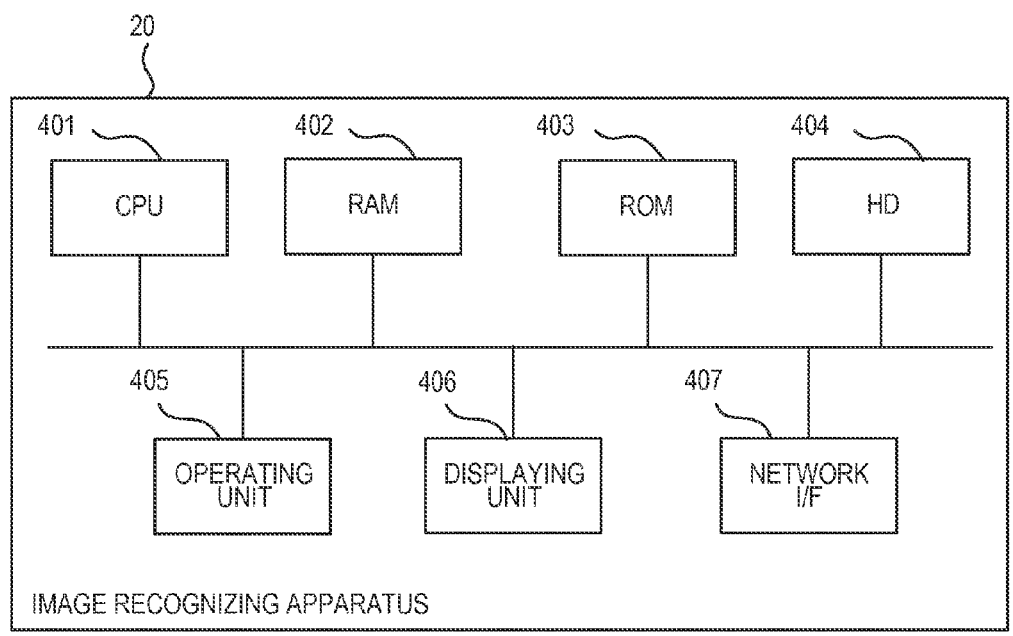
FIG. 4 is a block diagram illustrating an example of the hardware constitution of the image recognizing apparatus.

FIG. 4 is a block diagram illustrating an example of the hardware constitution of the image recognizing apparatus 20. In the constitution illustrated in FIG. 4, a CPU 401 controls the whole of the image recognizing apparatus 20. The CPU 401 realizes the constitution of the image recognizing apparatus 20 divided into function blocks to be described later and processes of flow charts according to the function blocks by executing programs stored in a ROM 403, an HD (hard disk) 404 or the like. A RAM 402 is a storage area which functions as a work area where the CPU 401 develops programs and executes the programs. The ROM 403 is a storage area which stores the programs to be executed by the CPU 401. The HD 404 is a storage area which stores various programs required when the CPU 401 executes processes and various data including data concerning a threshold and the like. An operating unit 405 accepts an inputting operation performed by a user. A displaying unit 406 displays various images such as an image shot by the camera 10, the image 100 to be identified, an operation screen used when the user operates the image recognizing apparatus 20, a setting screen used for setting various information and the like. A network I/F 407 is an interface unit to be used for connecting the image recognizing apparatus 20 with an external device which is not illustrated.

Figure 5A:
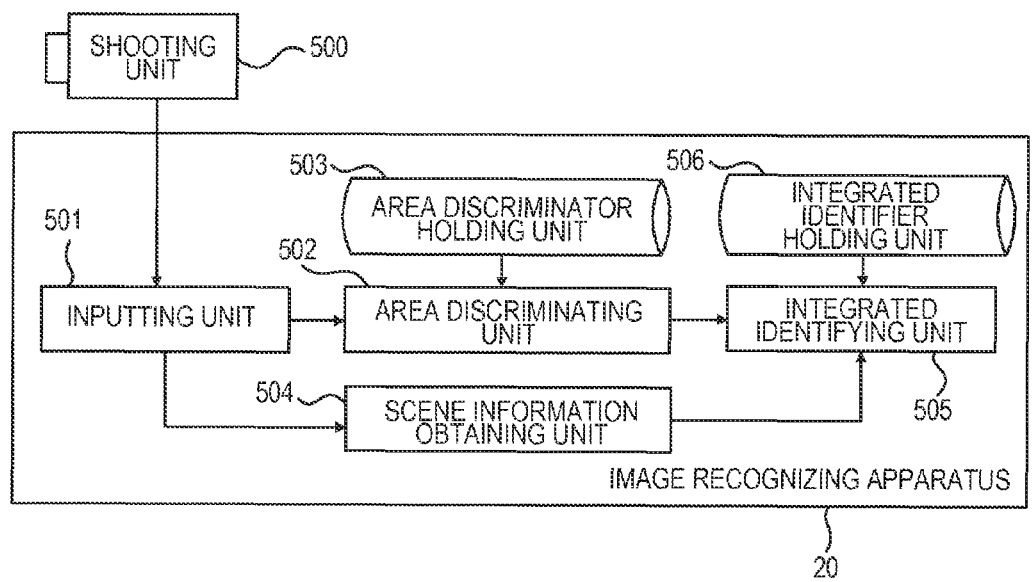
FIGS. 5A and 5B are block diagrams illustrating, as function blocks, the process to be performed by the CPU of the image recognizing apparatus.
Figure 5B:
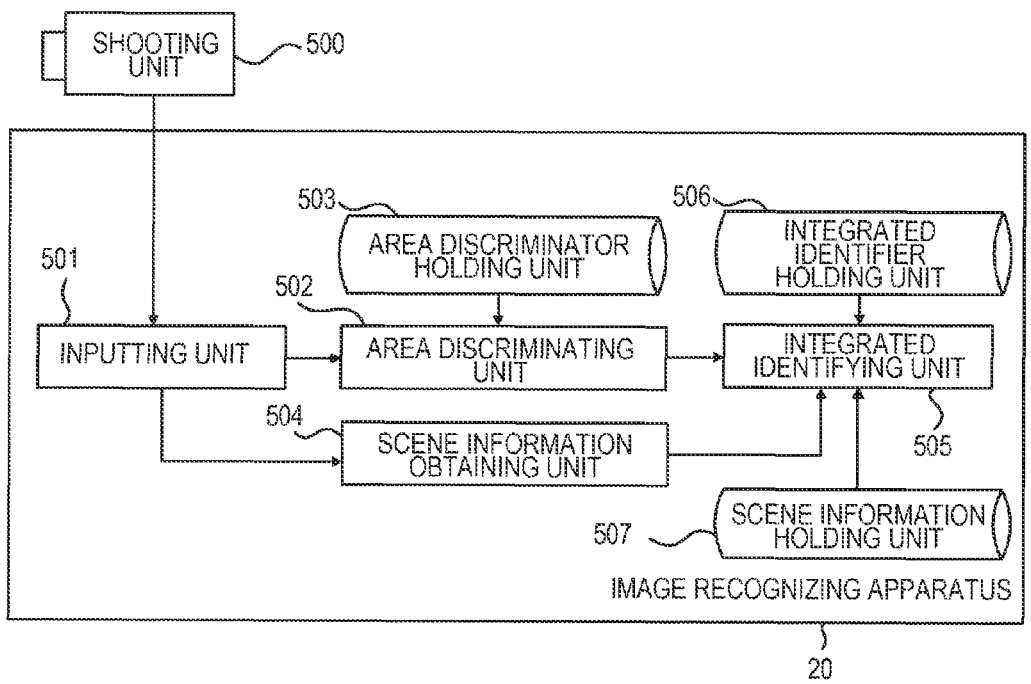

FIGS. 5A and 5B are block diagrams illustrating, as function blocks, the process to be performed by the CPU 401 of the image recognizing apparatus 20. In FIG. 5A, a shooting unit 500, which corresponds to the camera 10, is also illustrated other than the function blocks in the image recognizing apparatus 20. This shooting unit 500 obtains the image 100 to be identified. As illustrated in FIG. 5A, the CPU 401 of the image recognizing apparatus 20 executes processes expressed by the respective function blocks of an inputting unit 501, an area discriminating unit 502, a scene information obtaining unit 504, an integrated identifying unit 505, and an area discriminator holding unit 503 and an integrated identifier holding unit 506 serving as storage units. Incidentally, the area discriminator holding unit 503 and the integrated identifier holding unit 506 may be constituted to be connected with the image recognizing apparatus 20 as nonvolatile storage devices. The details of these function blocks included in the image recognizing apparatus 20 will be described later with reference to FIG. 6.

Figure 6:
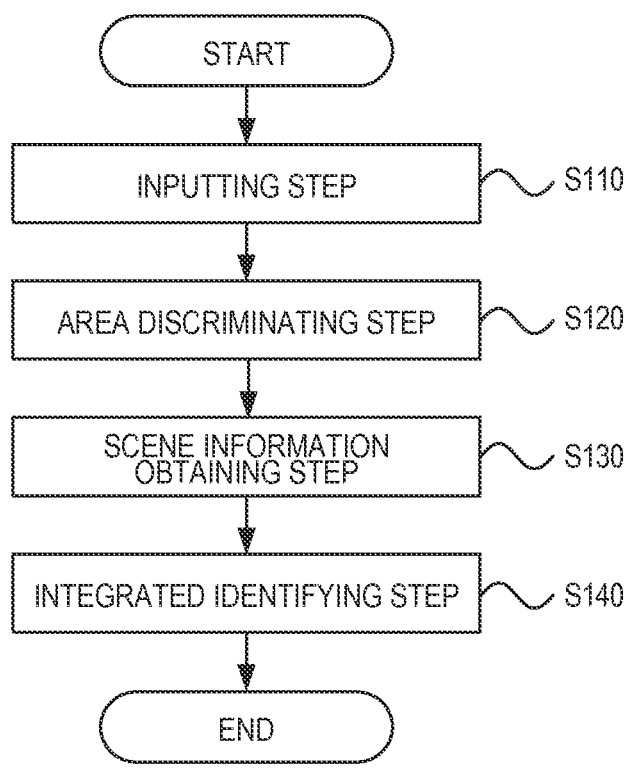
FIG. 6 is a flow chart indicating an example of a recognizing process to be performed by the image recognizing apparatus.

FIG. 6 is a flow chart indicating an outline of processes to be performed in the respective function blocks of the image recognizing apparatus 20 according to the present embodiment. In the flow chart of FIG. 6, the inputting unit 501 receives the image to be identified shot by the shooting unit 500 as input data in an inputting step S110. Next, as an area discriminating step S120, the area discriminating unit 502 performs the area discrimination of the image to be identified by using plural area discriminators stored in the area discriminator holding unit 503. Note that the details of the area discriminator will be described later. Each area discrimination result obtained by the area discriminating step 120 is transmitted to the integrated identifying unit 505.

Next, as a scene information obtaining step 130, the scene information obtaining unit 504 obtains scene information of the image to be identified. The scene information obtained by this scene information obtaining step 130 is transmitted to the integrated identifying unit 505. Note that the details of the scene information will be described later. Next, as an integrated identifying step 140, the integrated identifying unit 505 integrates area discrimination results of the plural area discriminators with the scene information and discriminates a class of each area of the image to be identified.

Next, a more specific flow of each process, which the CPU 401 of the image recognizing apparatus 20 illustrated in FIG. 5A performs, will be described with reference to the flow chart indicated in FIG. 6. First, as the inputting step S110, the inputting unit 501 obtains an image, which was taken by a process that the shooting unit 500 shot the scene 30 as illustrated in FIG. 1, as the image 100 to be identified. Incidentally, the image to be identified may be such an image stored in an external device which is not illustrated. In this case, the inputting unit 501 obtains the image, which was read out from the external device, as the image to be identified. The image stored in the external device may be, for example, such an image which was previously shot by the shooting unit 500 or the like or may be such an image which was stored after obtaining by another method applied via a network or the like. In addition, although there is sometimes a case that the inputting unit 501 obtains scene information or shooting information other than the image to be identified, this case will be described later.

Figures 7A, 7B, 7C:
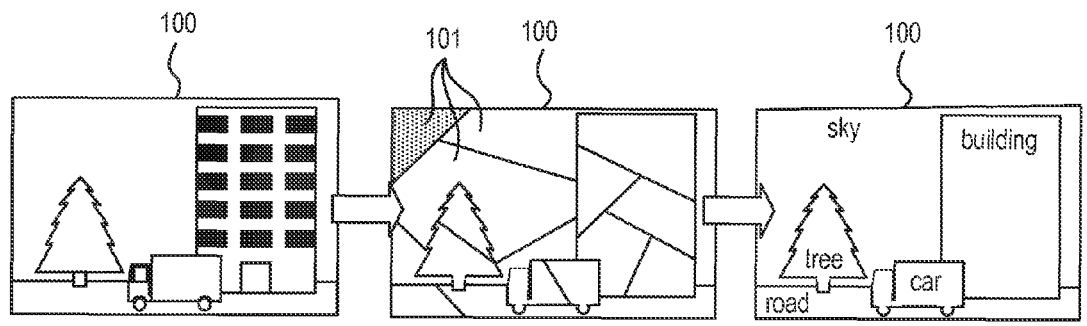
FIGS. 7A, 7B and 7C are diagrams for describing a process example of an area discriminating step.

Next, the area discriminating unit 502 performs the area discrimination of the image to be identified by using plural area discriminators stored in the area discriminator holding unit 503 as the area discriminating step S120. First, the area discriminating unit 502 sets, for example, small areas 101 as illustrated in FIG. 7B to the image 100 to be identified illustrated in FIG. 7A and identifies classes at those small areas 101. Note that FIG. 7C illustrates an example where the assignment of classes was performed for the image 100 to be identified as in FIG. 2B as a result that the area discriminating unit 502 performed the area discrimination of the image 100 to be identified. Here, the small area is such an area having one or more pixels in the image 100 to be identified and is composed of pixels of which the feature amount is equal to or less than a predetermined value. In addition, in the present embodiment, the area discriminating unit 502 divides the image 100 to be identified into small areas called an SP (Super Pixels) as described in, for example, the Non-Patent Literature 3. The small areas 101 may be such areas divided by another method such as a so-called block division.

Figures 8A, 8B, 8C:
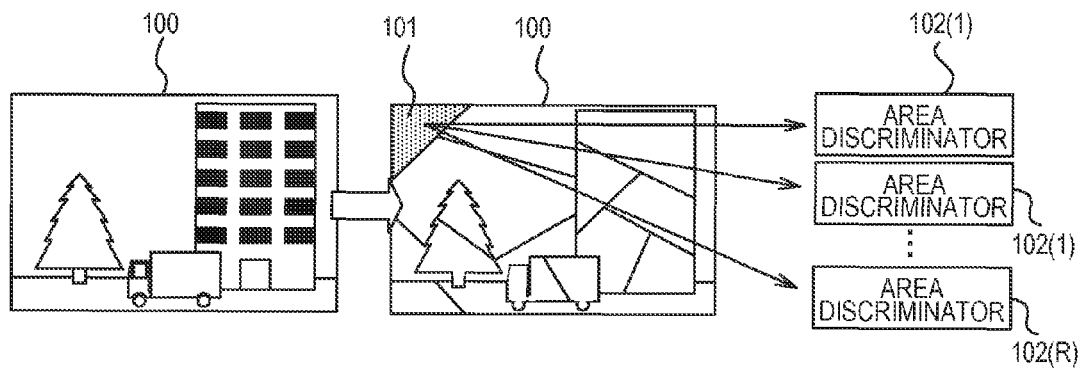
FIGS. 8A, 8B and 8C are diagrams for describing the process of the area discriminating step and area discriminators.

In this way, in the area discriminating step S120, the area discriminating unit 502 divides the image 100 to be identified illustrated in FIG. 8A into the small areas 101 as illustrated in FIG. 8B and performs the area discrimination of using the plural area discriminators indicated in FIG. 8C for the small areas 101. FIG. 8C indicates an example where area discriminators 102(1), 102(2), . . . and 102(R) are used as the plural area discriminators. Area discrimination results obtained at the area discriminators 102(1), 102(2), . . . and 102(R) indicated in FIG. 8C are transmitted to the integrated identifying unit 505. Here, the area discriminator, which extracts the feature amount from each of the small areas 101, is an identifier which treats the feature amount as an input. As the area discriminator, for example, Recursive-Neural-Networks (RNNs) as indicated in the Non-Patent Literature 1 may be used. In addition, the area discriminator may be an identifier which outputs an identification result by inputting the feature amount such as Support Vector Machines (SVMs) or the like. As to a discrimination learning method in the each area discriminator, it will be described later when describing a process to be performed in the learning. Incidentally, it is assumed that the number of the area discriminators is Rmax and the number of classes to be identified at each of the area discriminators is $C_R$ (R is an index which indicates each of the area discriminators, and R=1, 2, ... and $R_m$). In this case, a discriminator result $S_R$ of the area discriminator R is expressed by the following expression (1) for each of the small areas.

$$S_R = \{S_1, S_2, \ldots, S_{CR}\} \quad (1)$$

Here, each $S_n$ in the expression (1) is the likelihood for each class. For example, in a case that all of the number of classes to be identified at each of the area discriminators is "4" and the number of the area discriminators is "100", the likelihood expressed by 4×100=400 is output at each of the small areas. In the present embodiment, although a method, where the image to be identified is previously divided into small areas and the class discrimination is performed by the area discriminator for the each small area, has been described, the class discrimination is not limited to this method. The area division and the class identification may be performed at the same time by using, for example, a CRF (Conditional Random Field) as indicated in the Non-Patent Literature 2. In the present embodiment, although the respective small areas 101 illustrated in FIG. 7B or FIG. 8B are arranged in the image 100 to be identified without overlapping each other, parts of them may be overlapped. An integrating method of this case will be described later.

Next, the scene information obtaining unit 504 obtains the scene information of the image to be identified as the scene information obtaining step 130. The scene information obtained here is utilized in the next integrated identifying step 140. As to a utilizing method of the scene information, it will be described in the next description of the integrated identifying step 140. As for the scene information, a Spatial Pyramid Matching Kernel (hereinafter referred to as SPMK feature amount) as described in the Non-Patent Literature 4 or a GIST feature amount as described in the Non-Patent Literature 5 may be utilized. Alternatively, the scene information may be such a feature amount obtained by dividing an image into blocks and generating a histogram of the color distribution of each of the blocks. Other than the above-described feature amounts, the scene information may be any information such as a feature amount of representing the whole image or a result obtained by adding up feature amounts obtained from the respective parts of an image as a statistic quantity.

In case of utilizing the SPMK feature amount as in the Non-Patent Literature 4 as the scene information, the scene information is used by the following procedure. The integrated identifying unit 505 concentratedly obtains a local feature amount as described in the Non-Patent Literature 6 from a learning image and creates a code book vector as the integrated identifying step S140. The local feature amount may be any other amount such as a so-called image patch or an Edgelet feature amount characterized in that a certain level of the feature amount can be obtained from an image. The integrated identifying unit 505 estimates the code book vector by a clustering method such as a k-means method after obtaining the local feature amount from plural sheets of learning images. Here, the number of the code book vectors is assumed as "M".

Figure 9A:
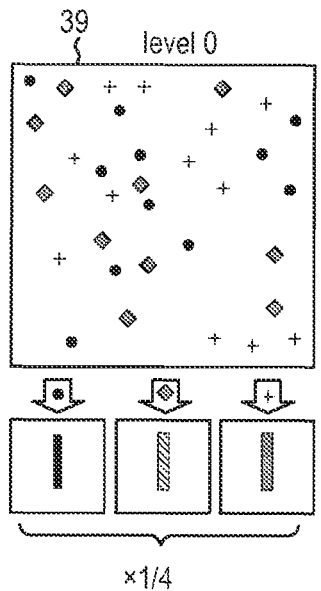
FIGS. 9A, 9B and 9C are diagrams for describing an example that a histogram feature amount is used as scene information.
Figure 9B:
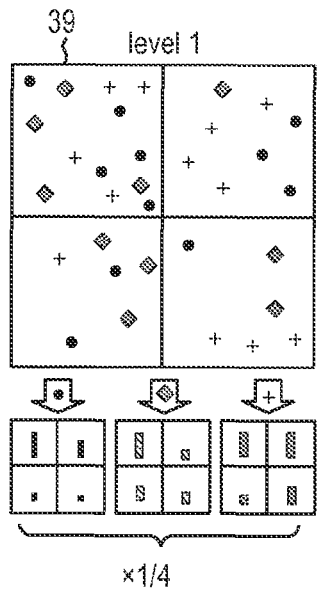
Figure 9C:
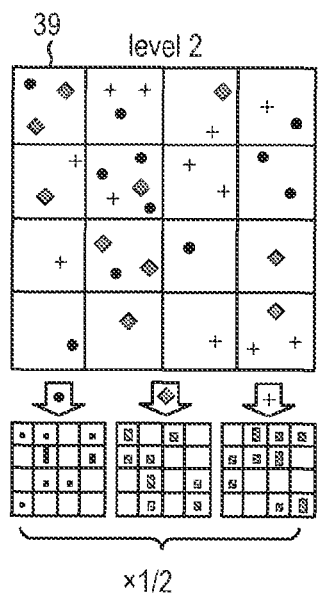

Next, the integrated identifying unit 505 assigns the local feature amounts obtained from the respective learning images to the corresponding code book vectors. Accordingly, a histogram feature amount (BOW (Bag-of-Words) feature amount), of which the number of bins is "M", is generated from each of the learning images. Although this M-dimensional histogram feature amount may be utilized as the scene information, the integrated identifying unit 505 further converts it into the SPMK feature amount. The SPMK feature amount is made into a form of histogram by a process that an image 39 is divided into plural blocks as illustrated in FIGS. 9A to 9C and the local feature amounts obtained from the image divided into the respective blocks are assigned to the code book vectors. Accordingly, positional information is obtained, and scene recognition accuracy is improved as compared with a case of the conventional BOW feature amount. In a case of an example of FIGS. 9A to 9C, the integrated identifying unit 505 divides the image into four blocks at a level 1 indicated in FIG. 9B and divides into 16 blocks at a level 2 indicated in FIG. 9C and generates the histogram feature amount from the total 21 blocks by adding one block at a level 0 indicated in FIG. 9A. Therefore, the feature amount becomes the 21M-dimensional histogram feature amount in total. In the present embodiment, although a process of a subset selecting step is performed by using the above scene information, that process will be described later.

Figure 10A:
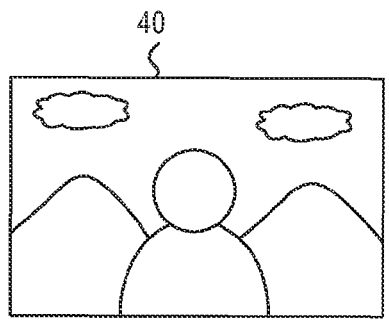
FIGS. 10A and 10B are diagrams for describing an example that a distance value of a ranging point is used as scene information.
Figure 10B:
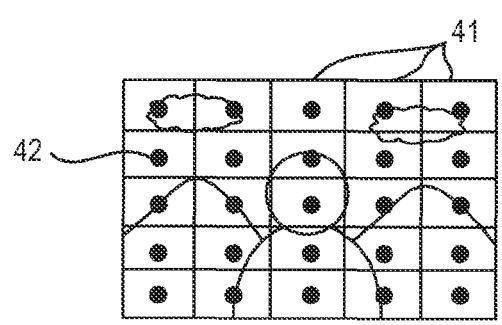

In the present embodiment, although the description of using the image feature amount, which is used in a field of the scene recognition or the image search, such as the SPMK feature amount or the GIST feature amount has been given, shot information which is obtained when shooting scene of an image by a camera may be used as the scene information. Note that the shooting information is such information other than an image, which is obtained when the camera 10 shot the scene and means all the information to be obtained by the camera 10 until outputting the image. For example, the shooting information includes distance information obtained when focusing on the scene, shutter speed information, color temperature used for determining a camera parameter when shooting the scene, information concerning a photometric value, the camera parameter determined by these information and the like. Besides, the shooting information may be shot date and time information, GPS information, information concerning top and bottom decision depending on an attitude sensor within a camera and the like. For example, the distance information obtained when focusing on the scene can be obtained as illustrated in FIGS. 10A and 10B. FIG. 10A illustrates an example of an image 40, and FIG. 10B illustrates an arrangement example of ranging (distance measurement) points 42 used for obtaining the object distance when shooting the scene of the image 40. For example, the ranging points 42 become center points of the respective ranging (distance measurement) frames 41 which are lattice-like arranged. When the number of the ranging points is assumed as "N" and distance values obtained at the respective ranging points are assumed as $Ph_n$ (n=1, 2, ... , n), a scene feature amount $S_c$ representing the scene information is expressed by the following expression (2) or expressed by the histogram feature amount obtained by making the scene feature amount $S_c$ into a form of histogram.

$$S_c = \{Ph_1, Ph_2, \ldots, Ph_n\} \quad (2)$$

Figure 11:
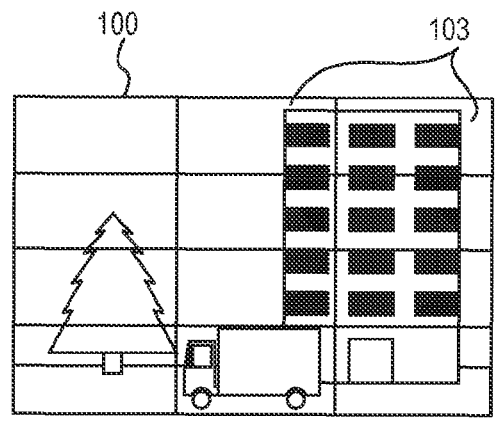
FIG. 11 is a diagram for describing an example that scene information is obtained for each block of an image.

In a case of the present embodiment, since all the above-described scene information are obtained from the whole of the image to be identified, the scene information, which is obtained for the image to be identified, is one information. Besides, the scene information may be obtained for each of blocks 103 after dividing the image 100 to be identified into blocks as illustrated in FIG. 11. Incidentally, parts of the respective blocks 103 when obtaining the scene information may be overlapped each other.

Next, the integrated identifying unit 505 integrates each of area discrimination results obtained in the area discriminating step S120 with the scene information obtained in the scene information obtaining step S130 and identifies a class of each of small areas as the integrated identifying step S140. Specifically, the integrated identifying unit 505 finally identifies the class by inputting a discrimination result of each area discriminator and a feature vector F, which combined the scene feature amount corresponding to the small area, into an integrated identifier as expressed by the expression (3) for each of the small areas. For example, in case of obtaining the scene information for each of the blocks 103 as in FIG. 11, the integrated identifying unit 505 combines the scene feature amount of the block to which the small area is belonged. Note that an identification learning method in the integrated identifier to be utilized will be described in a learning process to be described later.

$$F=\{S_1, S_2, \ldots, S_R, S_C\} \quad (3)$$

In a case that parts of the small areas are overlapped each other, the integrated identifying unit 505 once discriminates a class for each of the small areas and then determines the small area by performing an averaging process or a voting process to the class discrimination result of the small area, to which each of pixels is belonged. In a case that the area discrimination is performed by using, for example, the conditional random field (CRF) as described in the Non-Patent Literature 2 in the area discriminating step S120, the integrated identifying unit 505 may perform an integrating process for each of the pixels or perform the integrating process for each of the small areas in the integrated identifying step S140. In that case, the integrated identifying unit 505 may perform the integrating process after performing the averaging process to the area discrimination result for each of the small areas.

Figure 12A:
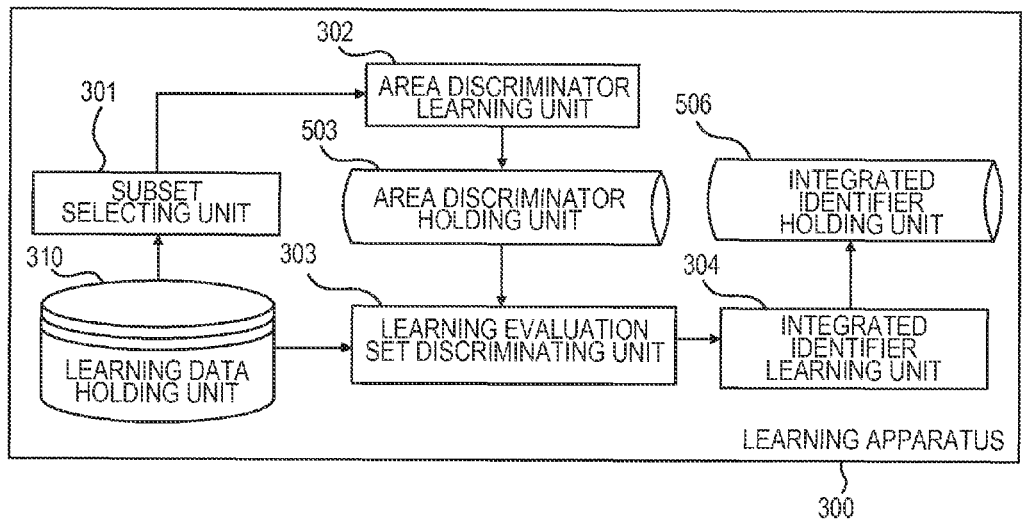
FIGS. 12A and 12B are block diagrams respectively illustrating examples of function constitutions of learning apparatuses in the first and second embodiments.
Figure 12B:
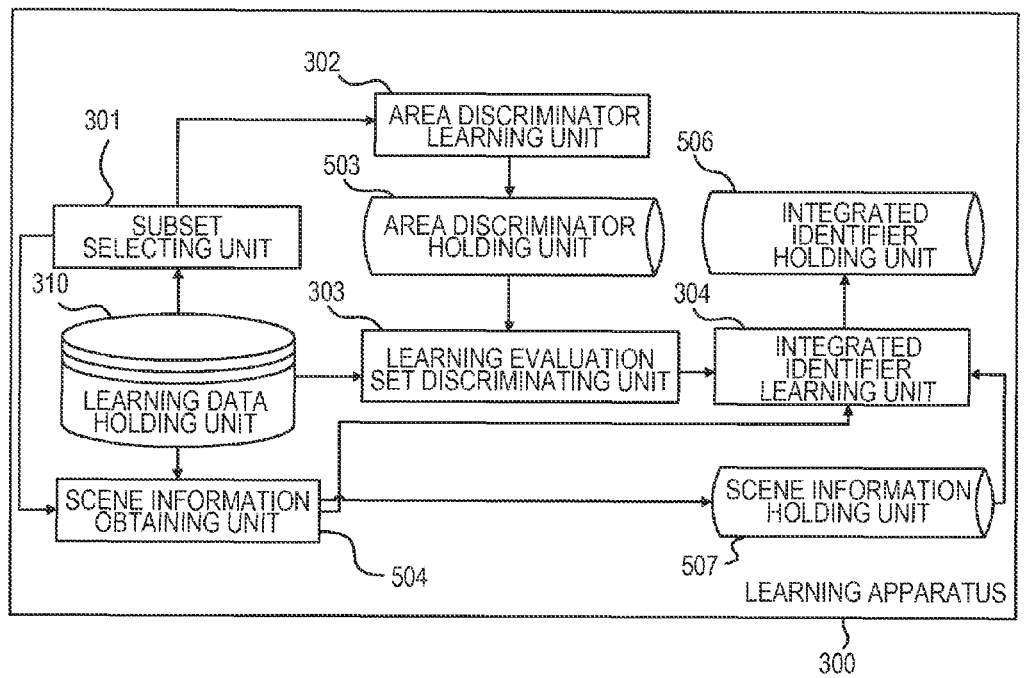

Next, learning methods of the area discriminator and the integrated identifier to be utilized in the area discriminating step S120 and the integrated identifying step S140 in the present embodiment will be described. FIG. 12A illustrates respective processes, which are performed by the CPU 401 serving as a learning apparatus 300 of the present embodiment, as function blocks. Note that the hardware constitution of the learning apparatus 300 is the same as that of FIG. 4. Here, although it is assumed that respective functions of the learning apparatus 300 in FIG. 12A are constituted separately from the image recognizing apparatus 20 illustrated in FIG. 5A, the respective functions of the learning apparatus 300 may be constituted in the image recognizing apparatus 20. That is, the CPU 401 of FIG. 4 may realize not only the function or the like of the image recognizing apparatus 20 but also the function constitution of the learning apparatus 300 and processes of a flow chart concerned with the learning apparatus 300 by executing programs stored in the ROM 403, the HD 404 or the like. In FIGS. 12A and 12B, the function performing the same work as that in FIGS. 5A and 5B is denoted by the same reference numeral.

As illustrated in FIG. 12A, the CPU 401 of the learning apparatus 300 executes respective functions of a subset selecting unit 301, an area discriminator learning unit 302, a learning evaluation set discriminating unit 303, an integrated identifier learning unit 304 and the area discriminator holding unit 503 and the integrated identifier holding unit 506, which serve as storage units. The details of the respective functions executed by the CPU 401 of the learning apparatus 300 will be described with reference to FIG. 13A.

Figure 14A:
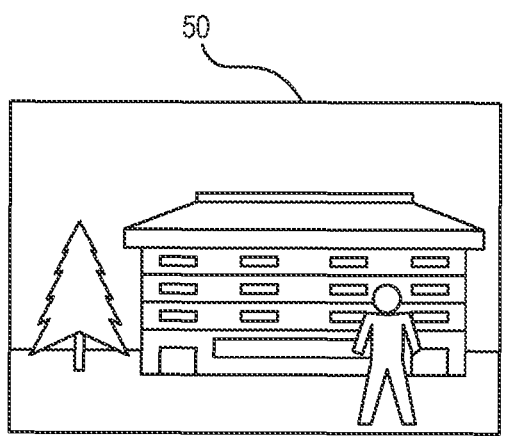
FIGS. 14A and 14B are diagrams illustrating an example of a learning image in the first embodiment.
Figure 14B:
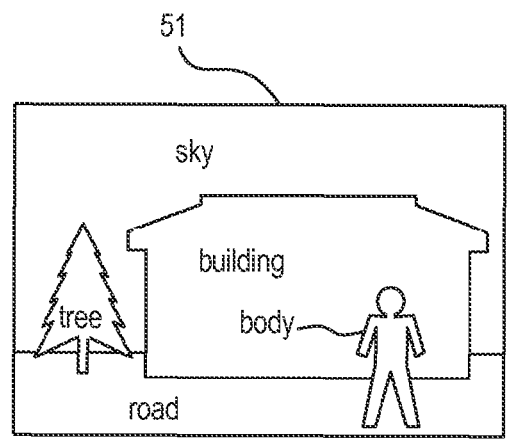

FIG. 13A indicates an outline of a process concerning the learning performed by the learning apparatus 300 illustrated in FIG. 12A. In a flow chart indicated in FIG. 13A, the subset selecting unit 301 sets learning data to be used in the learning of the each area discriminator on the basis of scene information of the learning data as a subset selecting step T110. As for the learning data, for example, an image 50 as illustrated in FIG. 14A, a ground truth (GT) 51, where class names of the respective pixels are defined as illustrated in FIG. 14B, and the scene information corresponding to each of learning images are required. The subset selecting unit 301 selects one or more learning images to be used in the learning of each of the area discriminators from the learning data held in a learning data holding unit 310 in the subset selecting step T110. The selected learning image is transmitted from the subset selecting unit 301 to the area discriminator learning unit 302 as a subset. The selecting method will be described in detail later.

Next, the area discriminator learning unit 302 learns the area discriminator by using data of the learning image, which was set in the subset selecting step T110, as an area discriminator learning step T120. The area discriminator learning unit 302 transmits the area discrimination result to the area discriminator holding unit 503. Next, the learning evaluation set discriminating unit 303 performs the area discrimination of a learning evaluation set by using each of the area discriminators, which was learned in the area discriminator learning step T120, as a learning evaluation set discriminating step T130. That is, the learning evaluation set discriminating unit 303 performs the area discrimination of the learning evaluation set by using the area discriminator stored in the area discriminator holding unit 503. The details of the learning evaluation set will be described later. The area discrimination result is transmitted to the integrated identifier learning unit 304. Next, the integrated identifier learning unit 304 learns a discriminator for discriminating a final class of each of the areas by integrating a result obtained by performing the area discrimination in the learning evaluation set discriminating step T130 with the scene information of the learning evaluation set as an integrated identifier learning step T140. That is, the integrated identifier learning unit 304 learns an integrated identifier on the basis of outputs of the plural area discriminators for the learning evaluation set and the scene information of the learning evaluation set and transmits the identification result to the integrated identifier holding unit 506.

Next, a more specific flow of each process to be performed by the CPU 401 of the learning apparatus 300 will be described with reference to a flow chart indicated in FIG. 13A. The subset selecting unit 301 selects a learning image to be used in the learning of the each area discriminator on the basis of the previously described scene information as the subset selecting step T110. Here, an example, where the previously described SPMK feature amount is used as the scene information, will be described.

Figure 15:
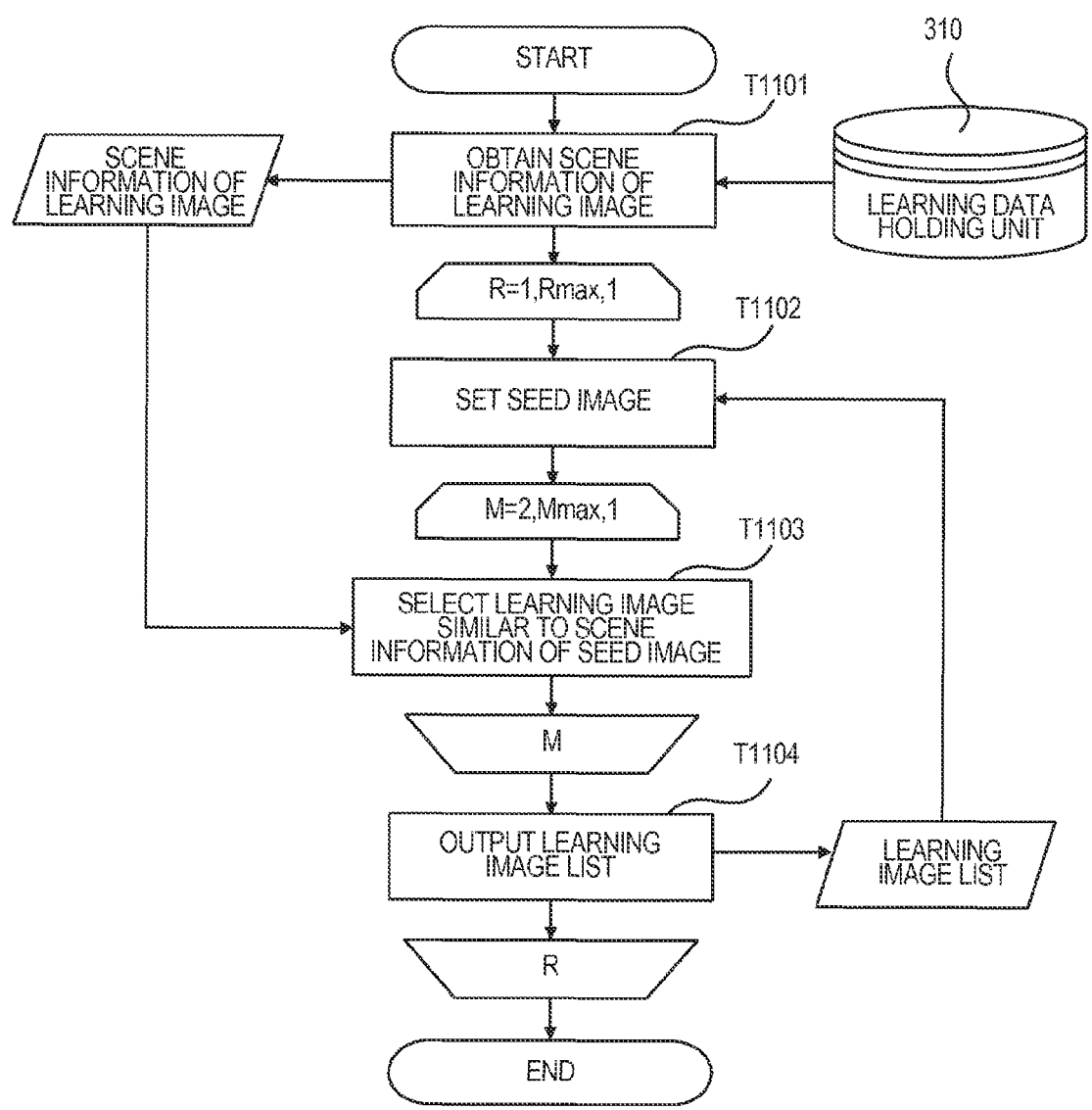
FIG. 15 is a flow chart indicating a subset selecting step in the first embodiment.

FIG. 15 is a more detailed flow chart of the subset selecting step T110 indicated in FIG. 13A. In FIG. 15, a reference symbol "R" is an index indicating each of the area discriminators, and it takes values from 1 to $R_{max}$. In FIG. 15, a reference symbol "M" indicates the number of learning images to be used in the learning to be performed by each of the area discriminators. Here, in order to simplify the description, it will be described that the number of learning images to be used in the learning to be performed by all the area discriminators is assumed to be the same number. In the flow chart of FIG. 15, the subset selecting unit 301 obtains the scene information of the learning image from the learning data holding unit 310 as a scene information obtaining step T1101. In a case of the present embodiment, the subset selecting unit 301 obtains the SPMK feature amount for all the learning data as the scene information. This obtained SPMK feature amount is held in the learning data holding unit 310 as learning image scene information. Next, the subset selecting unit 301 determines a seed image for the each area discriminator as a seed image setting step T1102. For example, the seed image may be one image randomly selected from among all the learning images or may be an image arbitrary selected by a user. Next, the subset selecting unit 301 selects a learning image, which is similar to the scene information of the seed image selected in the seed image setting step T1102, as a similar learning image selecting step T1103. In the present embodiment, although the number of learning images to be used in the learning to be performed by each of the area discriminators is assumed to be "M", the number of learning images of each of the area discriminators may be different from each other. In the present embodiment, although it is assumed that M sheets of the learning images are selected, the subset selecting unit 301 may select all the images, which are in a state that the similarity of the scene information exceeds a threshold, by previously setting the threshold, or may randomly select plural images from among those all images.

Next, the subset selecting unit 301 outputs a list of the learning images of each of the area discriminators set in the similar learning image selecting step T1103 as a learning image list outputting step T1104. In the present embodiment, the subset selecting unit 301 repeats processes from the seed image setting step T1102 to the learning image list outputting step T1104 $R_{max}$ times corresponding to the number of the area discriminators. In a case that the seed image is set in the seed image setting step T1102, the subset selecting unit 301 reads the learning image lists which were set so far, and a learning image which was not selected in the learning image lists may be set as the seed image if possible.

In the present embodiment, an example, where the learning image to be learned by the each discriminator is selected by setting the seed image and selecting an image of which scene information is similar to that of the seed image, has been indicated. As another example, clusters corresponding to the number of the area discriminators $R_{max}$ are generated by a clustering method such as a k-means method or the like on the basis of similarity of the scene information and a learning image belongs to each of the clusters may be set as a learning image of each of the area discriminators. In that case, the clustering may be performed by allowing the software assignment such that the learning image is learned by the plural area discriminators.

Next, the area discriminator learning unit 302 performs the learning of each of the area discriminators on the basis of the learning image (subset) selected in the subset selecting step T110 as the area discriminator learning step T120. As described before, the area discriminator may be any type of discriminator if it can discriminate a class of the each pixel. In the present embodiment, it is assumed that the area discriminator is the Recursive-Neural-Networks (RNNs) serving as one of the identifiers described in the Non-Patent Literature 1, which extracts the feature amount from each of the small areas 101 and treats that feature amount as an input.

Figure 16:
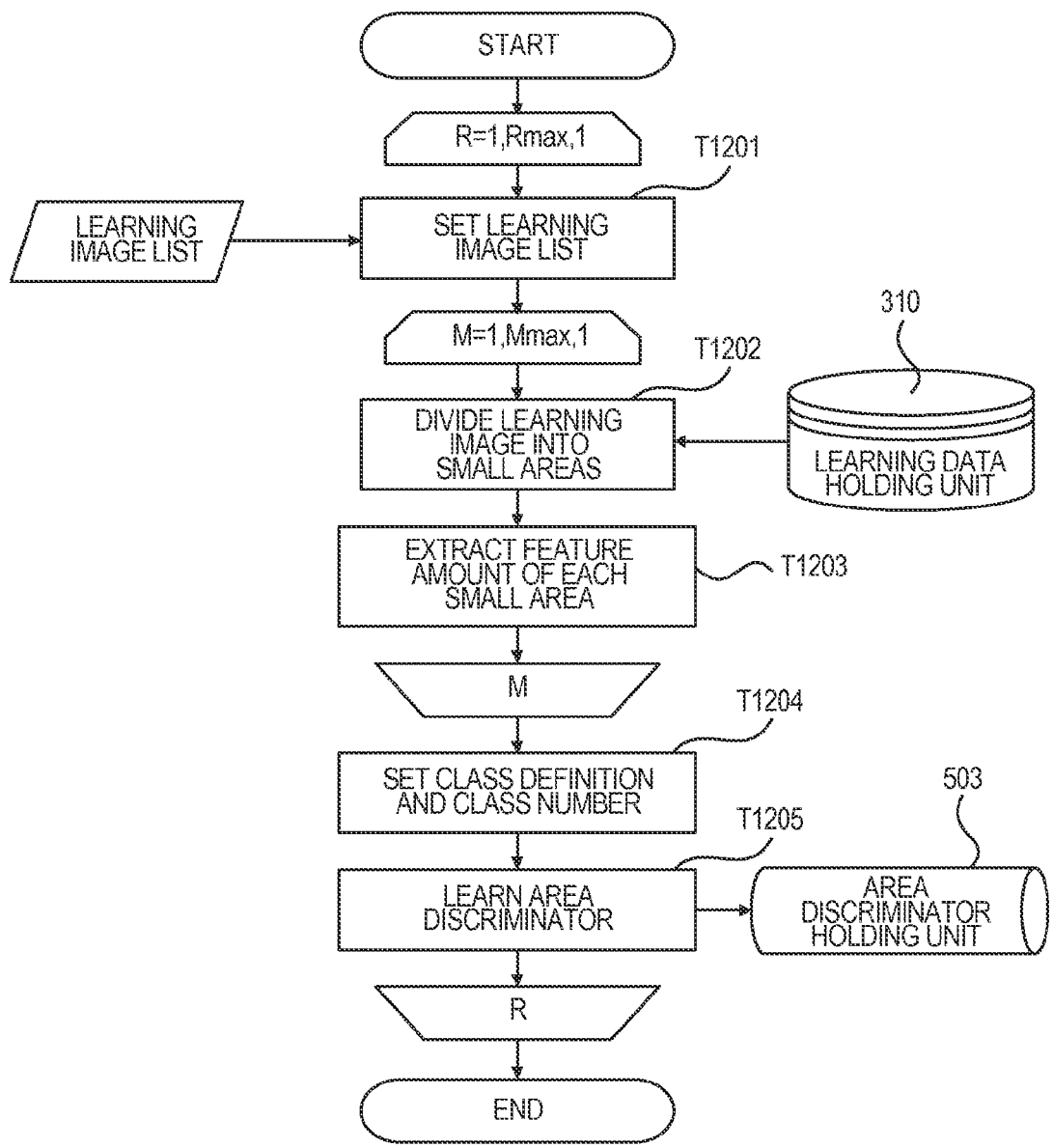
FIG. 16 is a flow chart indicating an area discrimination selecting step in the first embodiment.

FIG. 16 is a diagram indicating a more detailed flow chart of the area discriminator learning step T120. In FIG. 16, a reference symbol "R" is an index indicating each of the area discriminators, and it takes values from 1 to $R_{max}$. In FIG. 16, a reference symbol "M" indicates the number of learning images to be used in the learning to be performed by each of the area discriminators. Here, in order to simplify the description, it will be described that the number of learning images to be used in the learning to be performed by all the area discriminators is assumed to be the same number. In the flow chart of FIG. 16, the area discriminator learning unit 302 sets a list of the learning images to be used in the learning at each of the area discriminators as a learning image list setting step T1201. Next, the area discriminator learning unit 302 divides the each learning image to be used in the learning of the area discriminator into small areas on the basis of the learning image list, which was set in the learning image list setting step T1201, as a small area dividing step T1202. For example, as described in the area discriminating step S120 of the previous recognizing process, the learning image is divided into small areas called an SP (Super Pixels) as indicated in the Non-Patent Literature 3. Next, the area discriminator learning unit 302 extracts a feature amount of each of the small areas, which were divided in the small area dividing step T1202, as a small area feature amount extracting step T1203. Or, the area discriminator learning unit 302 may load the feature amount from the learning data holding unit 310 according to the learning image list by previously extracting the feature amounts of all the learning images. The area discriminator learning unit 302 performs processes of the small area dividing step T1202 and the small area feature amount extracting step T1203 for each of the learning images and all the small areas thereof. As an example of the feature amount, a statistic quantity of color feature or texture feature within each of the small areas may be used. For example, each of components of a color space such as RGB, HSV, Lab, YCbCr or the like, a Gabor filter, a filter response of a LoG (Laplacian of Gaussian) filter or the like can be used. The number of dimensions of the color feature becomes 12 dimensions of 4 (color spaces)×3 (components). As for the filter response, the number of dimensions becomes such the number which corresponds to the number of filters of the Gabor Filter and the LoG filter. In this case, since the characterization is performed for each area, the statistic quantity can be obtained from the feature amount obtained for each of pixels in the each small area. As the statistic quantities to be used here, four quantities of average, standard deviation, skewness and kurtosis are assumed to be used. The skewness is such the statistic quantity of indicating the degree of asymmetry of the distribution and the kurtosis is such the statistic quantity of indicating the degree of densely gathering the distributions near the average. Therefore, the number of dimensions of the color feature becomes 48 dimensions of 4 (color spaces)×3 (components)×4 (statistic quantities), and the number of dimensions of the texture feature becomes such a number obtained by (the number of filter responses)×4 (statistic quantities). In addition, center-of-gravity coordinates of the small area, the square measure of a small area or the like other than those described above may be also treated as the feature amount.

Next, the area discriminator learning unit 302 sets the class definition and the class number of an area, which is learned at each area discriminator, as a class number/class definition setting step T1204. The number of classes may be two or more. In an example of FIG. 14B, classes of "sky", "building", "tree", "road" and "body" are defined. In this case, the number of classes may be five classes or the classes of "building", "tree", "road" and "body" are combined to treat as one class, and the area discriminator of discriminating two classes of the combined class and the class of "sky" may be learned. Next, the area discriminator learning unit 302 learns the area discriminator for identifying the class, which was defined in the class number/class definition setting step T1204, as a learning step T1205. The learned area discriminator is stored in the area discriminator holding unit 503. Then, processes from the learning image list setting step T1201 to the learning step T1205 are performed for each of the area discriminators.

Figure 17:
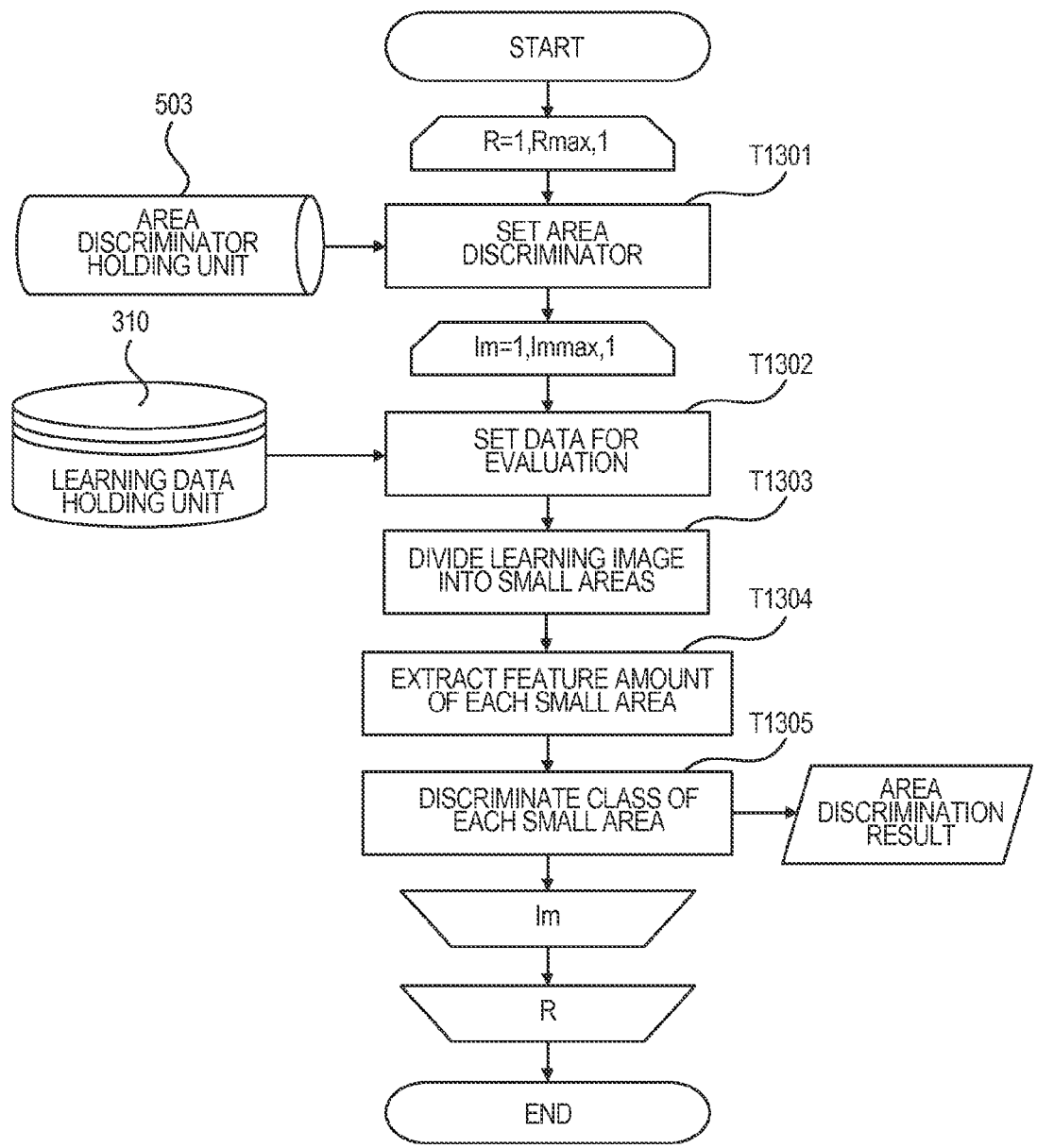
FIG. 17 is a flow chart indicating a learning evaluation set discriminating process in the first embodiment.

Next, the learning evaluation set discriminating unit 303 performs the area discrimination for the learning evaluation set by using the area discriminator, which was learned in the area discriminator learning step T120, as the learning evaluation set discriminating step T130 in FIG. 13A. FIG. 17 is a diagram indicating a more detailed flow of the learning evaluation set discriminating step T130. In FIG. 17, a reference symbol "R" is an index indicating each of the area discriminators similar to a case in FIG. 16. In addition, a reference symbol "Im" in FIG. 17 is an index indicating each of learning evaluation images to be treated as the learning evaluation set. Note that the learning evaluation set is required to be common for the evaluations of the all area discriminators. Here, in order to simplify the description, it will be described under the condition that the learning evaluation set indicates the whole image of the learning data. The learning evaluation set may be prepared separately from the learning data or may be randomly selected from the learning data. In the flow chart indicated in FIG. 17, the area discriminator learning unit 302 loads the area discriminator, which performs the learning evaluation, as an area discriminator setting step T1301. Next, the learning evaluation set discriminating unit 303 loads the learning evaluation image from the learning data holding unit 310 as an evaluating data setting step T1302. Hereinafter, similar to the above description, the learning evaluation set discriminating unit 303 divides the learning image into small areas in a small area dividing step T1303, extracts the feature amount of each of the small areas in a feature amount extracting step T1304 and performs the area discrimination in a class discriminating step T1305. A result obtained by performing the area discrimination in the class discriminating step T1305 is utilized in the next integrated identifier learning step T140.

Figure 18:
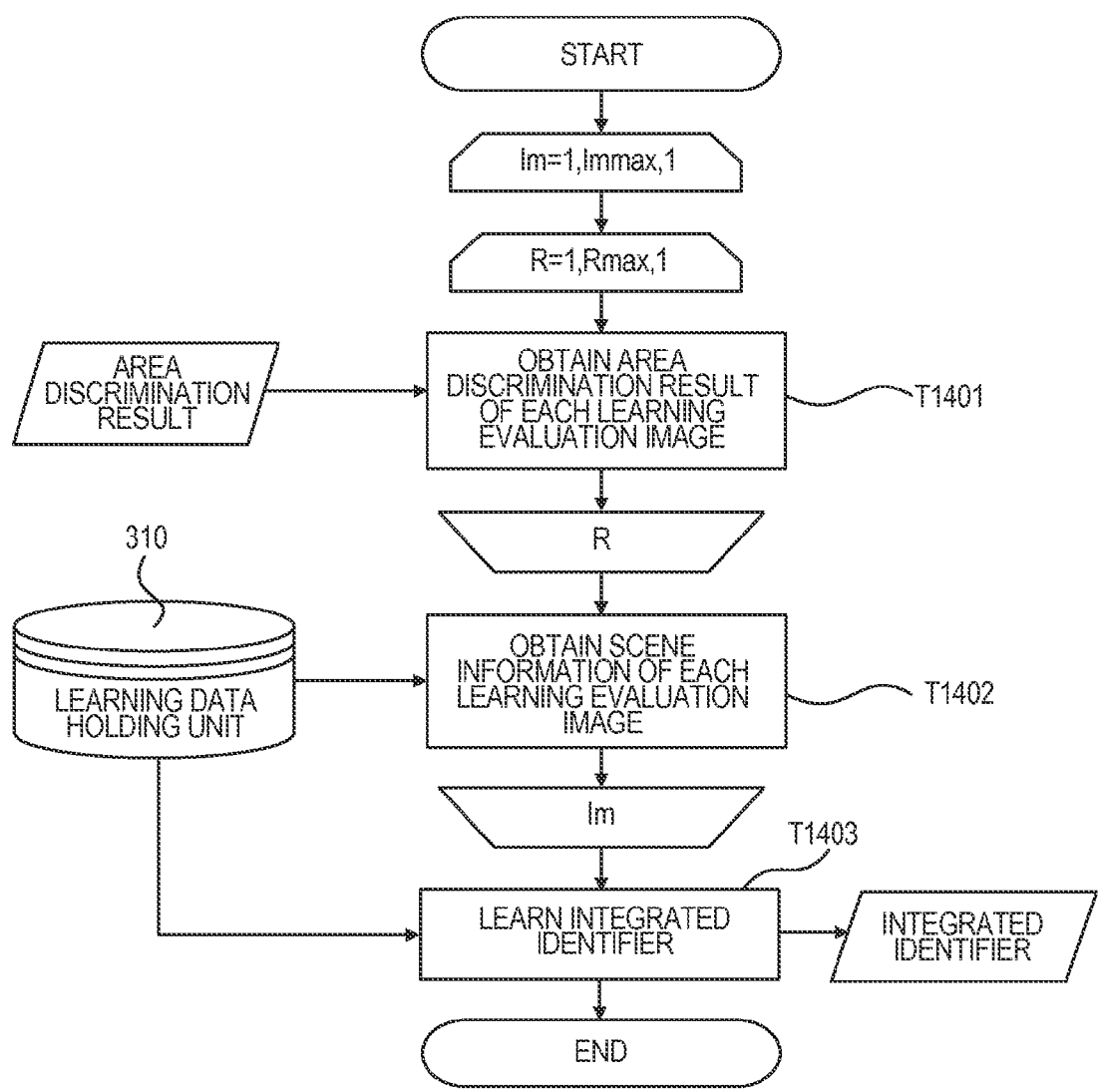
FIG. 18 is a flow chart indicating an integrated discriminator learning step in the first embodiment.

The integrated identifier learning unit 304 learns the identifier, which integrates a result obtained by performing the area discrimination by the learning evaluation set discriminating step T130 with the scene information of the learning evaluation set and discriminates a final class of each of the areas, as the integrated identifier learning step T140 in FIG. 13A. FIG. 18 is a diagram indicating a more detailed flow chart of the integrated identifier learning step T140 in FIG. 13A. Note that reference symbols "R" and "Im" in FIG. 18 are similar to those in FIG. 17. In the flow chart of FIG. 18, the integrated identifier learning unit 304 loads an area discrimination result corresponding to each of the learning evaluation images as an area discrimination result obtaining step T1401. Note that the area discrimination results, of which the number corresponds to the number of the area discriminators, exist for each of the learning evaluation images. For example, if all the area discriminators output the discrimination result of four classes, the 4R-dimensional output result of 4×R is obtained for each of the small areas. Next, the integrated identifier learning unit 304 obtains scene information for each of the learning evaluation images as a scene information obtaining step T1402. Here, as for the scene information, if the SPMK feature amount, which was described in the scene information obtaining step S130 of the previous recognizing process, is used, the 21M-dimensional scene information is to be obtained. Therefore, the (4R+21M)-dimensional information (feature amount) can be obtained for the each small area of the each learning evaluation image. Next, the integrated identifier learning unit 304 learns the integrated identifier on the basis of the feature amounts of each of the small areas, which were obtained in the area discrimination result obtaining step T1401 and the scene information obtaining step T1402, as a learning step T1403. Incidentally, the ground truth (GT) for each of the small areas is assumed to be stored in the learning data holding unit 310. As for the class to be learned, it is required to be learned according to the class definition to be finally output. In case of an example in FIG. 14B, five classes of "sky", "building", "tree", "road" and "body" are defined. Therefore, in this case, the integrated identifier learning unit 304 is required to learn an identifier which outputs the class likelihood corresponding to the five classes. The integrated identifier learning unit 304 may learn a multi-class identifier, which corresponds to even more classes, or learn, for example, five 2-class identifiers and assign a class, which has the highest class likelihood among those five identifiers, to the area. In the present embodiment, although an example of learning the integrated identifier by using the all learning data has been described, the learning evaluation image may be randomly selected without using the all learning evaluation images or small areas in the learning evaluation image may be randomly selected.

As described above, according to the present embodiment, the learning apparatus 300 selects the subset on the basis of the scene information from among the plural learning images and learns the plural area discriminators by using the subset. Further, the learning apparatus 300 performs the area discrimination according to the plural area discriminators by using the learning evaluation images and learns the integrated identifier which identifies a class of the area by integrating the area discrimination results with the scene information. Therefore, the image recognizing apparatus 20 becomes to be able to identify a class of each of areas of the image to be identified accurately by performing the identification by integrating the area discrimination results obtained by the plural area discriminators with the scene information. Accordingly, the image recognizing apparatus 20 can perform the area division and the image recognition with the high accuracy.

Second Embodiment

Next, the second embodiment will be described. In an integrated identifier learning step, a learning apparatus 300 of the second embodiment holds scene information of the learning image which was utilized when performing the learning of the each area discriminator and uses similarity to the scene information without utilizing the feature amount of the scene information as it is as in the first embodiment.

FIG. 12B illustrates a constitution example of function blocks of the learning apparatus 300 in the second embodiment. As illustrated in FIG. 12B, the learning apparatus 300 of the second embodiment has a scene information obtaining unit 504 and a scene information holding unit 507 in addition to the function constitution illustrated in FIG. 12A. The detailed constitution of the scene information obtaining unit 504 will be described later with reference to FIG. 13B. Since other constitutions in FIG. 12B are the same as those in FIG. 12A, the description thereof will be omitted.

FIG. 13B indicates an outline of processes from the selection of the subset to the learning of the integrated identifier performed by the learning apparatus 300 in the second embodiment. Since a process of a subset selecting step T210 in FIG. 13B is the same as that of the subset selecting step T110 of the learning process in the first embodiment, the description thereof will be omitted. In a flow chart of FIG. 13B, the scene information obtaining unit 504 obtains the scene information, which corresponds to each of the area discriminators, on the basis of the learning image, which was selected in the subset selecting step T210, as a scene information obtaining step T220. Then, the scene information obtaining unit 504 stores the obtained scene information into the scene information holding unit 507. The scene information which corresponds to each of the area discriminators will be described in detail later. Since an area discriminator learning step T230 in FIG. 13B is the same as the step T120 of the first embodiment and a learning evaluation set discriminating step T240 in FIG. 13B is the same as the step T130 of the first embodiment, the description thereof will be omitted. Although an integrated identifier learning step T250 in FIG. 13B is almost similar to the step T140 of the first embodiment, here, the learning of the integrated identifier is performed also by using the similarity between scene information of a learning evaluation set and the scene information which corresponds to each of the area discriminators. The scene information of the learning evaluation set is obtained by the scene information obtaining unit 504, and the scene information which corresponds to each of the area discriminators is stored in the scene information holding unit 507. Since processes of the scene information obtaining step T220 and the integrated identifier learning step T250 in FIG. 13B are different from those of the first embodiment, those processes are described in detail in the following.

The scene information obtaining unit 504 obtains the scene information, which corresponds to each of the area discriminators, as the scene information obtaining step T220. For example, the scene information obtaining unit 504 obtains scene information of the whole learning image selected in order to learn each of the area discriminators, and the mean vector thereof is treated as scene information which corresponds to each of the area discriminators. Or, in a case that the learning image is selected by a method of selecting the seed image as in the detailed flow chart in FIG. 15 concerning the subset selecting step T110 in the first embodiment, the scene information obtaining unit 504 may treat the scene information of each of the seed images as the scene information which corresponds to each of the area discriminators. As another case, in a case that the learning image is selected by using the clustering or the like, the scene information obtaining unit 504 may treat the scene information in the center of each of clusters as the scene information which corresponds to each of the area discriminators. Or, the scene information obtaining unit 504 calculates the similarity of the scene information between the learning images selected in order to learn each of the area discriminators, and an image characterized by the smallest sum of similarities to all other learning images is set as a center image, and scene information of the center image may be stored. As for the similarity, when the SPMK feature amount described in the first embodiment is utilized, the histogram distance or the like may be used. In addition, as for the similarity, anything is usable if it can calculate the distance between vectors.

Figure 19:
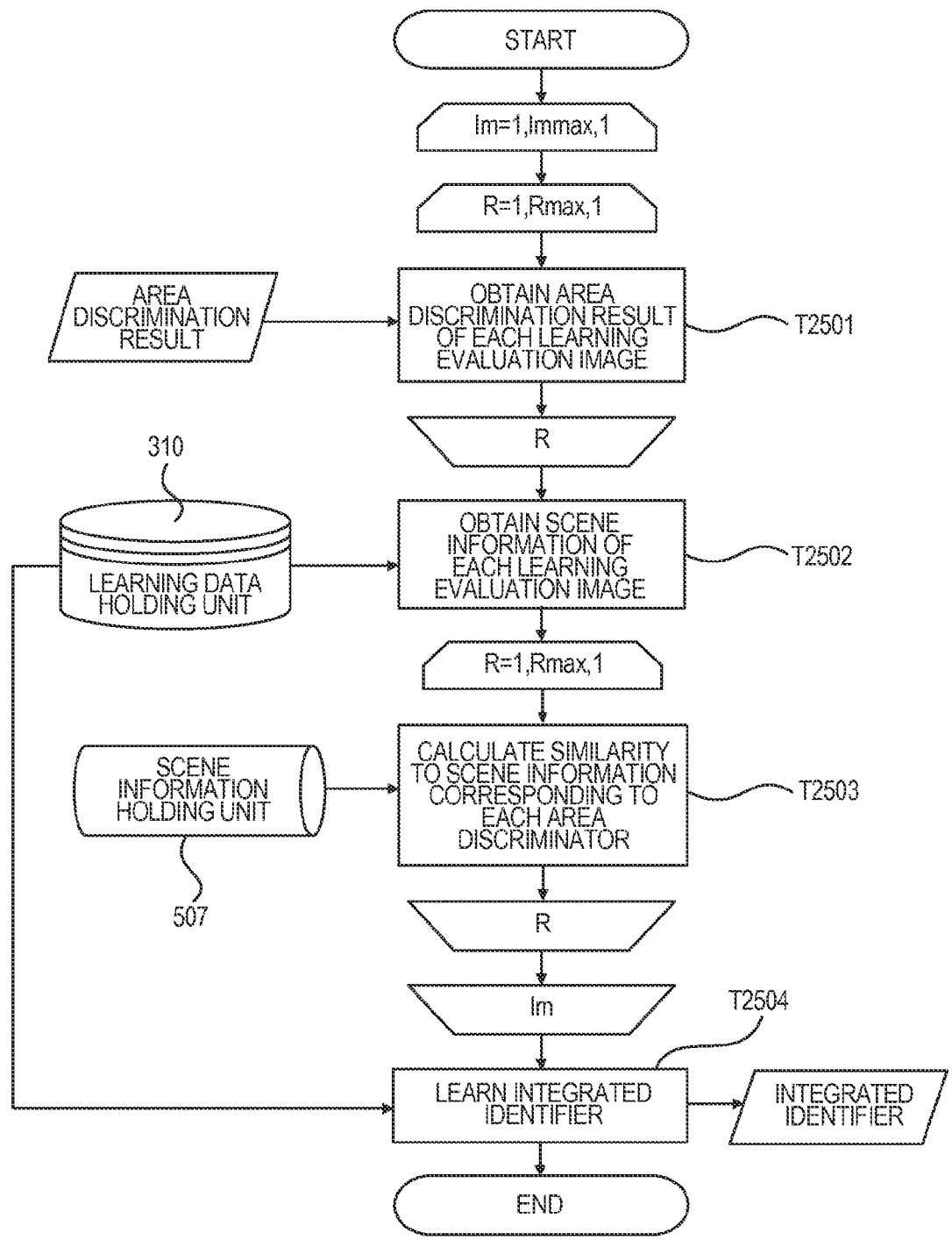
FIG. 19 is a flow chart indicating an integrated discriminator learning step in the second embodiment.

FIG. 19 is a detailed flow chart of the integrated identifier learning step T250 in the second embodiment. Note that reference symbols "R" and "Im" indicated in FIG. 19 are the same as those in FIGS. 17 and 18. In the flow chart of FIG. 19, the integrated identifier learning unit 304 loads an area discrimination result corresponding to each of the learning evaluation images similar to a case of the step T1401 in FIG. 18 in the first embodiment as an area discrimination result obtaining step T2501. Here, it is assumed that the integrated identifier learning unit 304 obtains the 4R-dimensional output result of 4×R for each of the small areas similar to a case of the first embodiment. A process of a scene information obtaining step T2502 in FIG. 19 is the same as that of the step T1402 in FIG. 18 in the first embodiment, and the scene information for each of the learning evaluation images is obtained.

Next, the flow advances to a process of a similarity calculating step T2503, and the integrated identifier learning unit 304 calculates the similarity between the scene information for each of the learning evaluation images obtained in the scene information obtaining step T2502 and the scene information which corresponds to each of the area discriminators. Since the similarity is calculated with the scene information which corresponds to each of the area discriminators, when the number of the area discriminators is "R", it becomes the R-dimensional information (feature amount). Therefore, as the similarity, the 5R-dimensional information (feature amount) of 4R+R is obtained for the each small area of the each learning evaluation image. In case of the second embodiment, since the number of dimensions of the SPMK feature amount is generally great such as 128 as compared with a case of the first embodiment, when the number of the area discriminators is small, the number of dimensions of the information (feature amount) to be utilized when performing the integrated identification can be reduced. Next, the integrated identifier learning unit 304 learns the integrated identifier on the basis of the feature amounts of each of the small areas obtained in the scene information obtaining step T2502 and the similarity calculating step T2503 as a learning step T2504. A learning method is the same as the process in the detailed flow chart of FIG. 18 in the first embodiment. As to a process when performing the identification, since the process is the same as that of the first embodiment, the description thereof will be omitted.

As described above, according to the second embodiment, the learning apparatus 300 selects the subset from the learning data holding unit 310 on the basis of the scene information and learns the plural area discriminators by using the selected subset. In addition, the learning apparatus 300 learns the integrated identifier, which identifies a class of the area, by integrating the area discrimination results obtained by the plural area discriminators with the scene information. In that case, the learning apparatus 300 holds the scene information of the learning image which was utilized when performing the learning of each of the area discriminators at the time of the learning and learns the integrated identifier which identifies a class of the area on the basis of the similarity to that scene information. Therefore, an image recognizing apparatus 20 of the second embodiment becomes to be able to identify a class of each of areas of the image to be identified accurately by performing the identification by integrating the similarities between the area discrimination results obtained by the plural area discriminators and the scene information. Accordingly, the image recognizing apparatus 20 of the second embodiment can perform the area division and the image recognition with the high accuracy. In addition, since the image recognizing apparatus 20 of the second embodiment more utilizes the similarity of the scene information as compared with a case of the first embodiment, the number of dimensions of the information (feature amount) to be input to the integrated identifier can be reduced.

In a case that the learning of the area discriminator and the identifier is performed and the scene information is held in the learning apparatus 300 of this second embodiment, the image recognizing apparatus 20 can be realized by, for example, the constitution illustrated in FIG. 5B. FIG. 5B illustrates a constitution example of function blocks of the image recognizing apparatus 20 in the second embodiment. That is, the image recognizing apparatus 20 of the second embodiment has the scene information holding unit 507 in addition to the respective functions in FIG. 5A described before as illustrated in FIG. 5B. Then, the integrated identifying unit 505 discriminates a class of each of the areas of the image to be identified by using the scene information held in the scene information holding unit 507. In FIG. 5B, since the constitution excepting the scene information holding unit 507 is the same as that of FIG. 5A, the description thereof will be omitted.

Third Embodiment

Figure 20A:
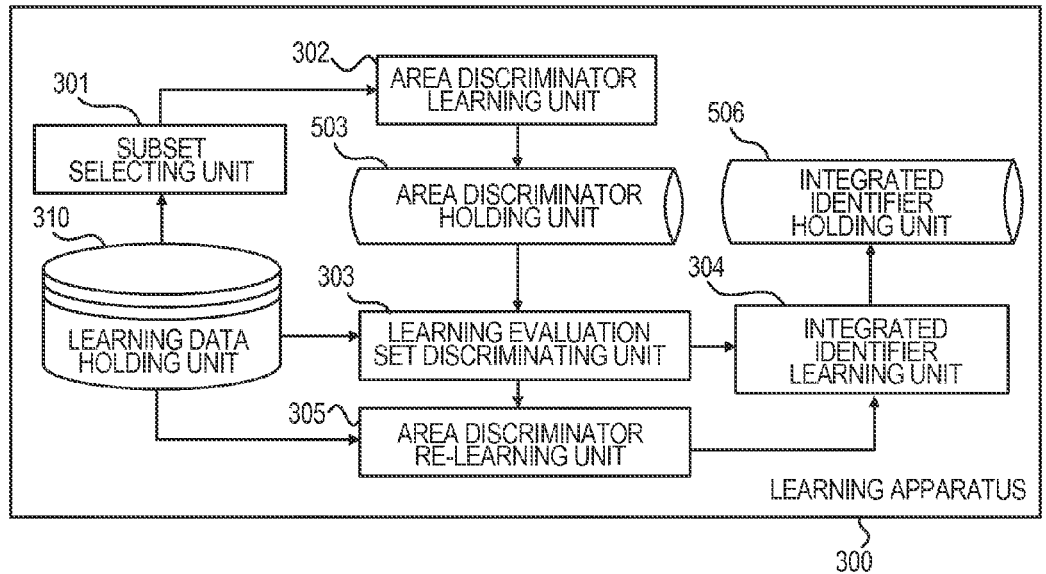
FIGS. 20A, 20B and 20C are block diagrams respectively illustrating examples of function constitutions of learning apparatuses in the third, fourth and fifth embodiments.

Next, the third embodiment will be described. A learning apparatus 300 of the third embodiment performs the re-learning, that is, the area re-discrimination according to a result of the learning evaluation set discrimination different from an example of the first embodiment. FIG. 20A indicates an example of each of processes to be performed by a CPU 401 of the learning apparatus 300 of the third embodiment as a function block. The learning apparatus 300 in the third embodiment is made to be able to execute the function of the function block of an area discriminator re-learning unit 305 in addition to the function block constitution of the learning apparatus 300 illustrated in FIG. 12A. As to the detailed description of the area discriminator re-learning unit 305, it will be described later with reference to FIG. 13C. In the learning apparatus 300 of FIG. 20A, since the constitution excepting the area discriminator re-learning unit 305 is the same as that of FIG. 12A, the description thereof will be omitted.

FIG. 13C indicates an outline of processes until when the learning apparatus 300 in the third embodiment learns the integrated identifier. In the flow chart of FIG. 13C, since a subset selecting step T310 is the same as the step T110 in the first embodiment and an area discriminator learning step T320 is the same as the step T120 in the first embodiment, the description thereof will be omitted. In addition, since a learning evaluation set discriminating step T330 is the same as the step T130 in the first embodiment, the description thereof will be omitted. In FIG. 13C, the area discriminator re-learning unit 305 performs the re-learning of the area discriminator, which was decided that the re-learning is required as a result (area re-discrimination result) of performing the area discrimination to the learning evaluation set in the learning evaluation set discriminating step T330, as an area discriminator re-learning step T340. Since a process of this area discriminator re-learning step T340 is different from the process in the first embodiment, it will be described in detail in the following. Although a process of an integrated identifier learning step T350 is almost similar to the step T140 of the first embodiment, here, the learning of the integrated identifier is performed also using a result obtained by performing the area re-discrimination to the learning evaluation set at the area discriminator which was re-learned in the area discriminator re-learning step T340.

Figure 21:
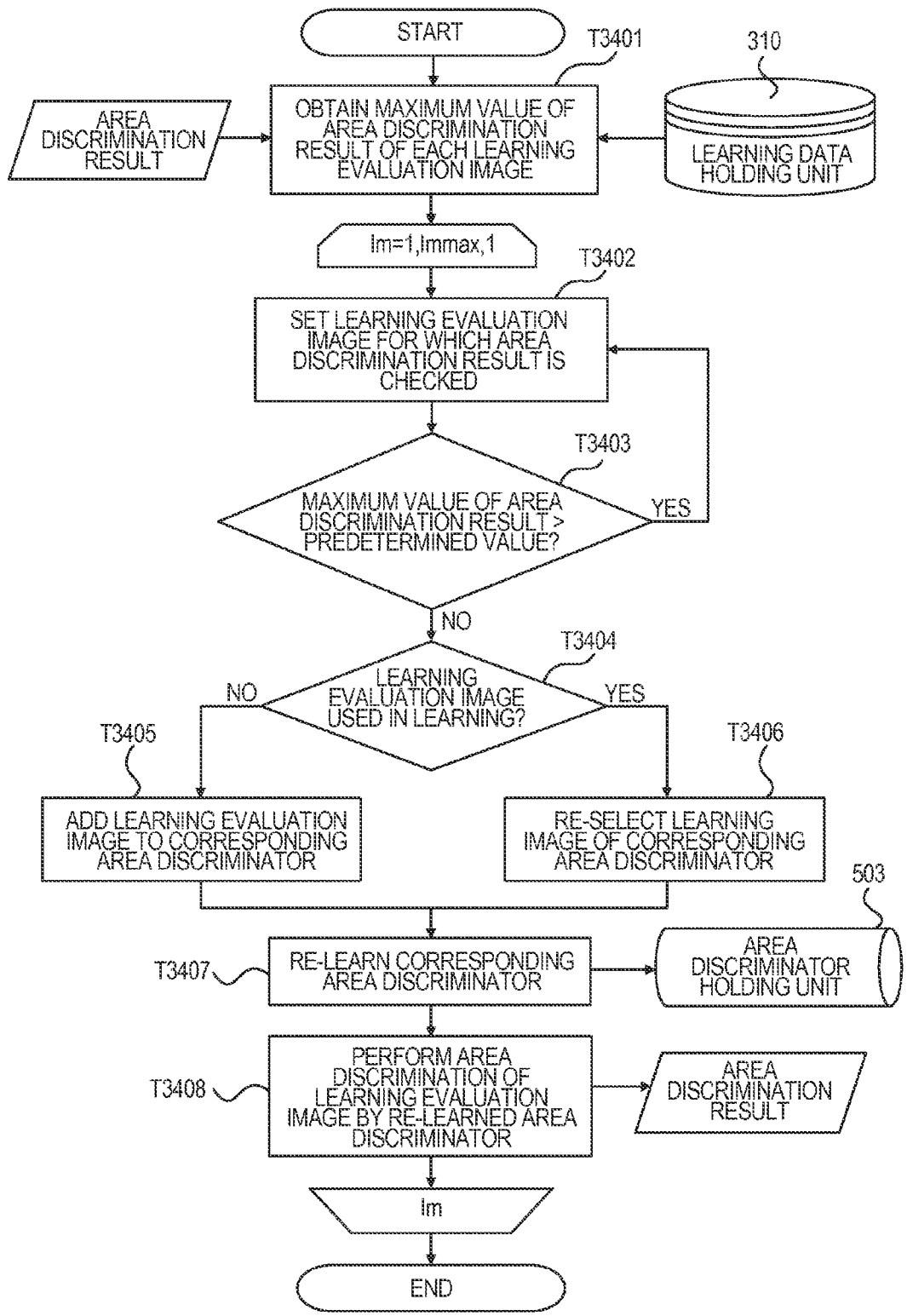
FIG. 21 is a flow chart indicating an area discriminator re-learning step in the third embodiment.

Hereinafter, the details of the process of the area discriminator re-learning step T340 will be described. FIG. 21 is a detailed flow chart of the area discriminator re-learning step T340. A reference symbol "Im" in FIG. 21 is an index which represents each of the learning evaluation images. In the third embodiment, it is assumed that area discriminator learning data is identical with a learning evaluation image set. In the flow chart of FIG. 21, the area discriminator re-learning unit 305 obtains an area discrimination result, which has the highest area discrimination accuracy among the area discrimination results at each of the area discriminators of the learning evaluation images, as a maximum value obtaining step T3401. The area discrimination result may be calculated by the Pixel Accuracy which calculates an accuracy rate of the each pixel. Here, when it is assumed that the accuracy of the area discrimination result of the area discriminator R for the learning evaluation image Im is $PA_{Im|R}$, the accuracy $PA_{Im}$ of the area discrimination result for the each learning evaluation image to be obtained in the maximum value obtaining step T3401 is expressed by the following expression (4).

$$PA_{Im} = \underset{R}{\mathrm{argmax}} PA_{Im|R} \qquad (4)$$

Next, the area discriminator re-learning unit 305 checks the accuracy $PA_{Im}$ of the area discrimination result, which was obtained in the maximum value obtaining step T3401, for each of the learning evaluation images after an evaluation image setting step T3402. That is, the area discriminator re-learning unit 305 checks whether or not the accuracy $PA_{Im}$, which was set in the evaluation image setting step T3402, exceeds a predetermined value as a maximum value deciding step T3403. When it is decided that the accuracy exceeds the predetermined value in this maximum value deciding step T3403, the area discriminator re-learning unit 305 does not shift to a re-learning process and sets the accuracy $PA_{Im}$ of the next learning evaluation image. On the other hand, when it is decided that the accuracy does not exceed the predetermined value in the maximum value deciding step T3403, the area discriminator re-learning unit 305 shifts to a process of an evaluation image learning deciding step T3404.

When the flow advances to the evaluation image learning deciding step T3404, the area discriminator re-learning unit 305 checks whether or not the learning evaluation image Im is utilized at the time when the area discriminator performs the learning. Incidentally, when the area discriminator learning data is not identical with the learning evaluation image set, the area discriminator learning unit 302 checks the learning image of which the scene information is most similar to that of the learning evaluation image Im among the learning data. When it was decided that the learning evaluation image Im is not utilized at the time even when performing the learning of any area discriminator in the evaluation image learning deciding step T3404, the area discriminator re-learning unit 305 advances the process to an area discriminator adding step T3405. When the flow advances to the area discriminator adding step T3405, the area discriminator learning unit 302 adds the learning evaluation image Im to the leaning image of the area discriminator of which the scene information is similar to that of the learning evaluation image Im and performs the re-learning. When the image of the area discriminator of which the scene information is similar to that of the learning evaluation image Im is selected, the area discriminator learning unit 302 obtains the similarity between the scene information of the seed image of each of the area discriminators and the scene information of the learning evaluation image Im. On the other hand, when it was decided that the learning evaluation image Im had been learned in the evaluation image learning deciding step T3404, the area discriminator re-learning unit 305 reselects the learning image of the area discriminator, which had been learned, as a learning image re-selecting step T3406. The area discriminator re-learning unit 305 removes, for example, an image of which scene information is not similar to that of the learning evaluation image Im or adds another learning image of which scene information is similar to that of the learning evaluation image Im among the learning images of the corresponding area discriminator. Note that although a re-selecting method of the learning image has been described in this embodiment, the area discriminator re-learning unit 305 may change or add the feature amount to be utilized in the area discriminator or may change the number of classes and the class definition. Next, the area discriminator re-learning unit 305 advances the process to a re-learning step T3407 after performing the processes of the area discriminator adding step T3405 and the learning image re-selecting step T3406.

When the flow advances to the re-learning step T3407, the area discriminator re-learning unit 305 performs the re-learning of the area discriminator by using matters changed in the area discriminator adding step T3405 and the learning image re-selecting step T3406. Thereafter, the area discriminator re-learning unit 305 performs the area discrimination of the learning evaluation set again by using the area discriminator, which was relearned in the re-learning step T3407, as an evaluation image area discriminating step T3408. This area discrimination result is utilized in the next integrated identifier learning step T350. Since a process when performing the recognition in this integrated identifier learning step T350 is the same as that of the first embodiment, the description thereof will be omitted.

As described above, according to the third embodiment, the learning apparatus 300 selects the subset from the learning data holding unit 310 on the basis of the scene information and learns the plural area discriminators by using the selected subset. In addition, the learning apparatus 300 evaluates the plural area discriminators which were learned, and when the sufficient performance is not obtained for the learning evaluation set, the re-learning of the area discriminators is performed. Then, the learning apparatus 300 integrates the area discrimination results obtained by the plural area discriminators with the scene information and learns the integrated identifier which identifies a class of the area. Therefore, the image recognizing apparatus 20 in the case of the third embodiment becomes to be able to identify a class of each of areas of the image to be identified accurately by performing the identification by integrating the area discrimination results obtained by the plural area discriminators with the scene information. Accordingly, the image recognizing apparatus 20 of the third embodiment can perform the area division and the image recognition with the high accuracy.

Fourth Embodiment

Figure 20B:
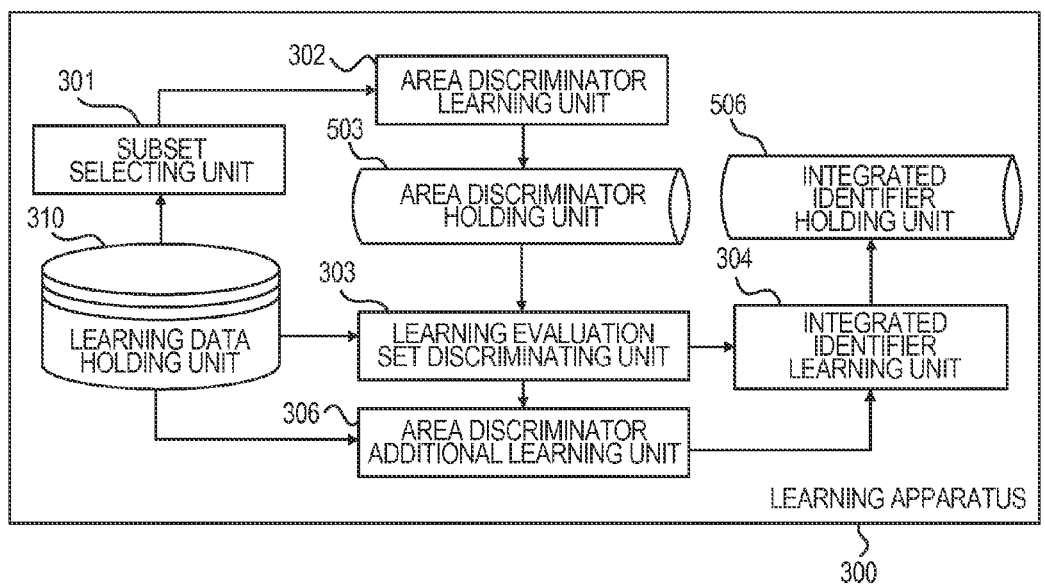

Next, a learning apparatus 300 of the fourth embodiment will be described. The learning apparatus 300 of the fourth embodiment performs the additional learning of the area discriminator in response to a result of the learning evaluation set discrimination different from a case of the first embodiment. FIG. 20B illustrates a constitution example of function blocks for the processes to be performed by the CPU 401 of the learning apparatus 300 in the fourth embodiment. The learning apparatus 300 in the fourth embodiment is made to be able to perform the function of an area discriminator additional learning unit 306 in addition to the functions of the function constitution illustrated in FIG. 12A. As to the detailed description of the area discriminator additional learning unit 306, it will be described later with reference to FIG. 13D. Since other constitutions are the same as those of FIGS. 12A and 12B, the description thereof will be omitted.

FIG. 13D indicates an outline of processes until when the learning apparatus 300 in the fourth embodiment learns the integrated identifier. Since a subset selecting step T410 in FIG. 13D is the same as the step T110 in the first embodiment and an area discriminator learning step T420 is the same as the step T120 in the first embodiment, the description thereof will be omitted. In addition, since a learning evaluation set discriminating step T430 is the same as the step T130 in the first embodiment, the description thereof will be omitted. In a case of the fourth embodiment, the area discriminator additional learning unit 306 performs a process of an area discriminator additional learning step T440 of FIG. 13D. In this step T440, the area discriminator additional learning unit 306 performs the additional learning of the area discriminator which was decided to be required to perform the additional learning as a result of performing the area discrimination to the learning evaluation set in the learning evaluation set discriminating step T430. Since a process of the area discriminator additional learning step T440 is different from a case of the first embodiment, it will be described in detail.

Figure 22:
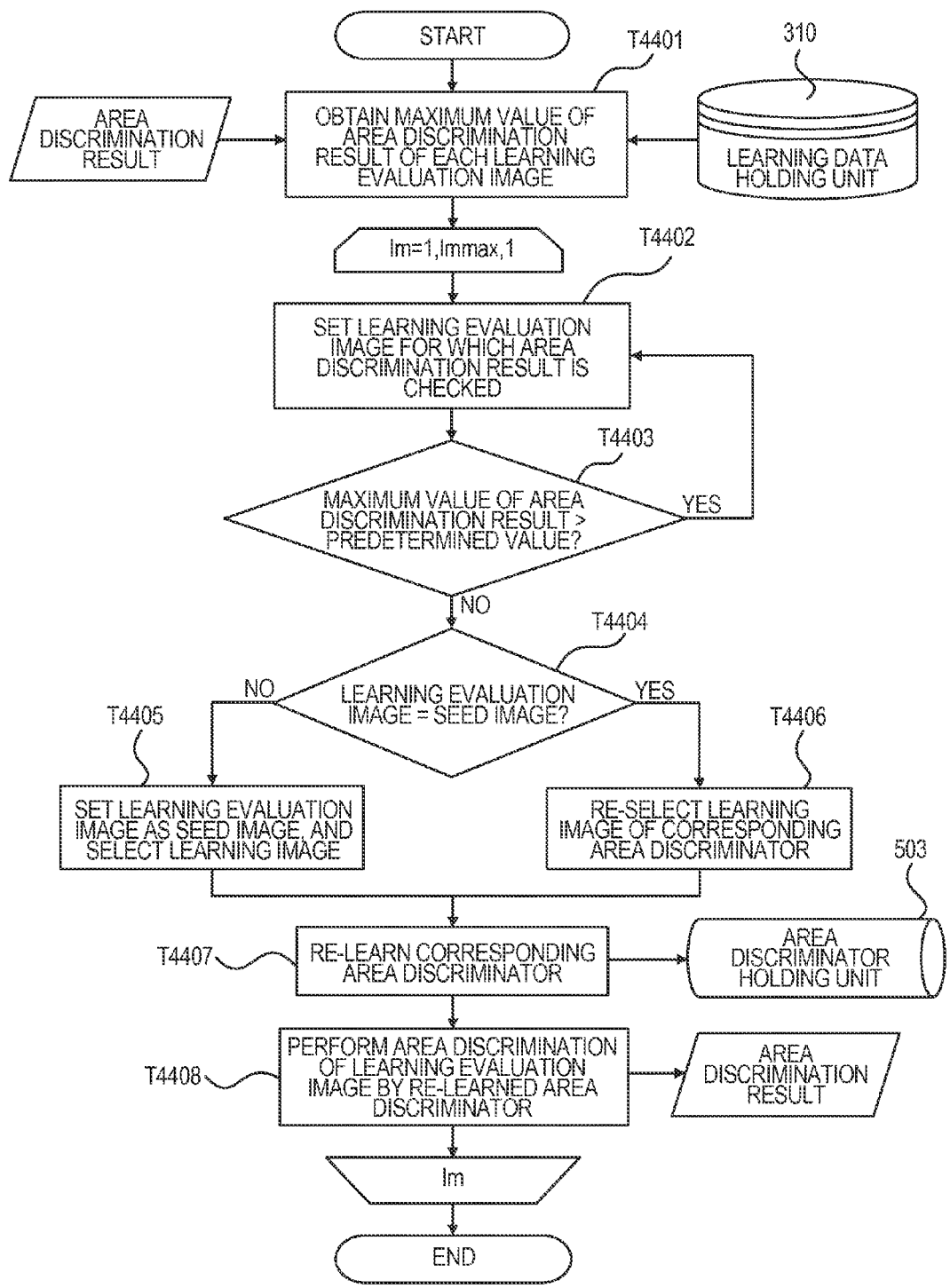
FIG. 22 is a flow chart indicating an area discriminator additional learning step in the fourth embodiment.

Although an integrated identifier learning step T450 is almost similar to the integrated identifier learning step T140, the learning apparatus 300 learns the integrated identifier by using also a result obtained by performing the area discrimination to the learning evaluation set by the area discriminator which was relearned in the area discriminator additional learning step T440. Next, a more specific process of the area discriminator additional learning step T440 will be described. FIG. 22 is a flow chart indicating an example of a detailed flow of the area discriminator additional learning step T440. In FIG. 22, since processes from a maximum value obtaining step T4401 to a maximum value deciding step T4403 are the same as those from the step T3401 to the step T3403 in the third embodiment indicated in FIG. 21, the description thereof will be omitted.

In the flow chart of FIG. 22, when it is decided that the maximum value does not exceed a predetermined value in the maximum value deciding step T4403, the area discriminator additional learning unit 306 advances the process to a seed image deciding step T4404. When the flow shifts to the process of the seed image deciding step T4404, the area discriminator additional learning unit 306 checks whether or not the learning evaluation image Im is set as any of the seed images of the area discriminators. When it is decided that the learning evaluation image Im is not set as the seed image in the seed image deciding step T4404, the area discriminator additional learning unit 306 sets the learning evaluation image Im as a new seed image as a learning image selecting step T4405. When the flow advances to a process of the learning image selecting step T4405, the area discriminator additional learning unit 306 selects the predetermined number of the leaning images having the similar scene information. Accordingly, the area discriminator additional learning unit 306 additionally learns the area discriminator by using the selected learning images as a next re-learning step T4407. On the other hand, when it is decided that the learning evaluation image Im is set as the seed image in the seed image deciding step T4404, the area discriminator additional learning unit 306 advances the process to a learning image re-selecting step T4406. When the flow advances to the process of the learning image re-selecting step T4406, the area discriminator additional learning unit 306 reselects the learning image of the area discriminator set as the seed image. Since this re-selecting method is the same as the learning image re-selecting step T3406 in the third embodiment, the description thereof will be omitted.

Next, the area discriminator additional learning unit 306 advances the process to the re-learning step T4407 after performing the processes of the area discriminator adding step T3405 and the learning image re-selecting step T4406. Since the processes from the re-learning step T4407 to an evaluation image area discriminating step T4408 are the same as those from the re-learning step T3407 to the evaluation image area discriminating step T3408 in the third embodiment indicated in FIG. 21, the description thereof will be omitted. Since a process when performing the recognition in the integrated identifier learning step T450 is the same as that of the first embodiment, the description thereof will be omitted.

As described above, according to the fourth embodiment, the learning apparatus 300 selects the subset from the learning data holding unit 310 on the basis of the scene information and learns the plural area discriminators by using the selected subset. In addition, the learning apparatus 300 evaluates the plural area discriminators which were learned, and when the sufficient performance is not obtained for the learning evaluation set, the additional learning of the area discriminators is performed. Then, the learning apparatus 300 integrates the area discrimination results obtained by the plural area discriminators with the scene information and learns the integrated identifier which identifies a class of the area. Therefore, the image recognizing apparatus 20 of the fourth embodiment becomes to be able to identify a class of each of areas of the image to be identified accurately by performing the identification by integrating the area discrimination results obtained by the plural area discriminators with the scene information. Accordingly, the image recognizing apparatus 20 of the fourth embodiment can perform the area division and the image recognition with the high accuracy.

Fifth Embodiment

Figure 20C:
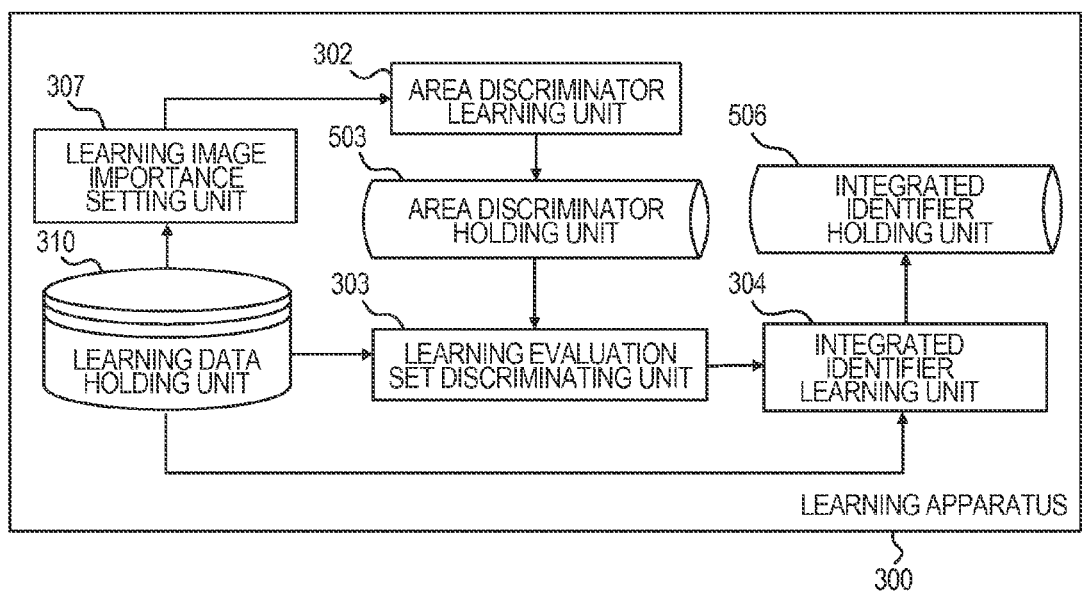

A learning apparatus 300 in the fifth embodiment does not select a learning image to be learned at each of the area discriminators but sets an importance of each of the learning images to be learned at each of the area discriminators. Then, the learning apparatus 300 learns the area discriminator on the basis of the importance. FIG. 20C illustrates a constitution example of function blocks for the processes to be performed by the CPU 401 of the learning apparatus 300 in the fifth embodiment. The learning apparatus 300 in the fifth embodiment is made to be able to perform the function of a learning image importance setting unit 307 instead of the subset selecting unit 301 of which the function constitution is illustrated in FIGS. 12A and 12B. As to the detailed description of the learning image importance setting unit 307, it will be described later with reference to a flow chart of FIG. 13E. Since other constitutions are the same as those in FIGS. 12A and 12B, the description thereof will be omitted. FIG. 13E indicates an outline of processes until when the learning apparatus 300 in the fifth embodiment learns the integrated identifier. In this FIG. 13E, the learning image importance setting unit 307 sets the importance of the learning image to be used for the learning at each of the area discriminators as a learning image importance setting step T510 different from the subset selecting step T110 of the learning process in the first embodiment. In the fifth embodiment, the importance is set on the basis of the scene information. A specific setting method of the importance will be described later.

Although an area discriminator learning step T520 in FIG. 13E is almost similar to the area discriminator learning step T120 of the first embodiment, the learning image importance setting unit 307 performs the learning by using the importance, which was set in the learning image importance setting step T510, when performing the learning of each of the area discriminators. For example, when learning the area discriminator by using the Recursive-Neural-Networks as indicated in the Non-Patent Literature 1, the learning image importance setting unit 307 sets the weight of combination of combining an input layer with an intermediate layer, which are to be corresponded to each of the learning images, according to the importance. In addition, in case of using an identification model such as the Support Vector Machines (SVMs), the learning image importance setting unit 307 utilizes the importance as the weight when calculating an empirical error at the time of performing the learning. Since a learning evaluation set discriminating step T530 is the same as the step T130 of the first embodiment and an integrated identifier learning step T540 is the same as the step T140 of the first embodiment, the description thereof will be omitted.

Figure 23:
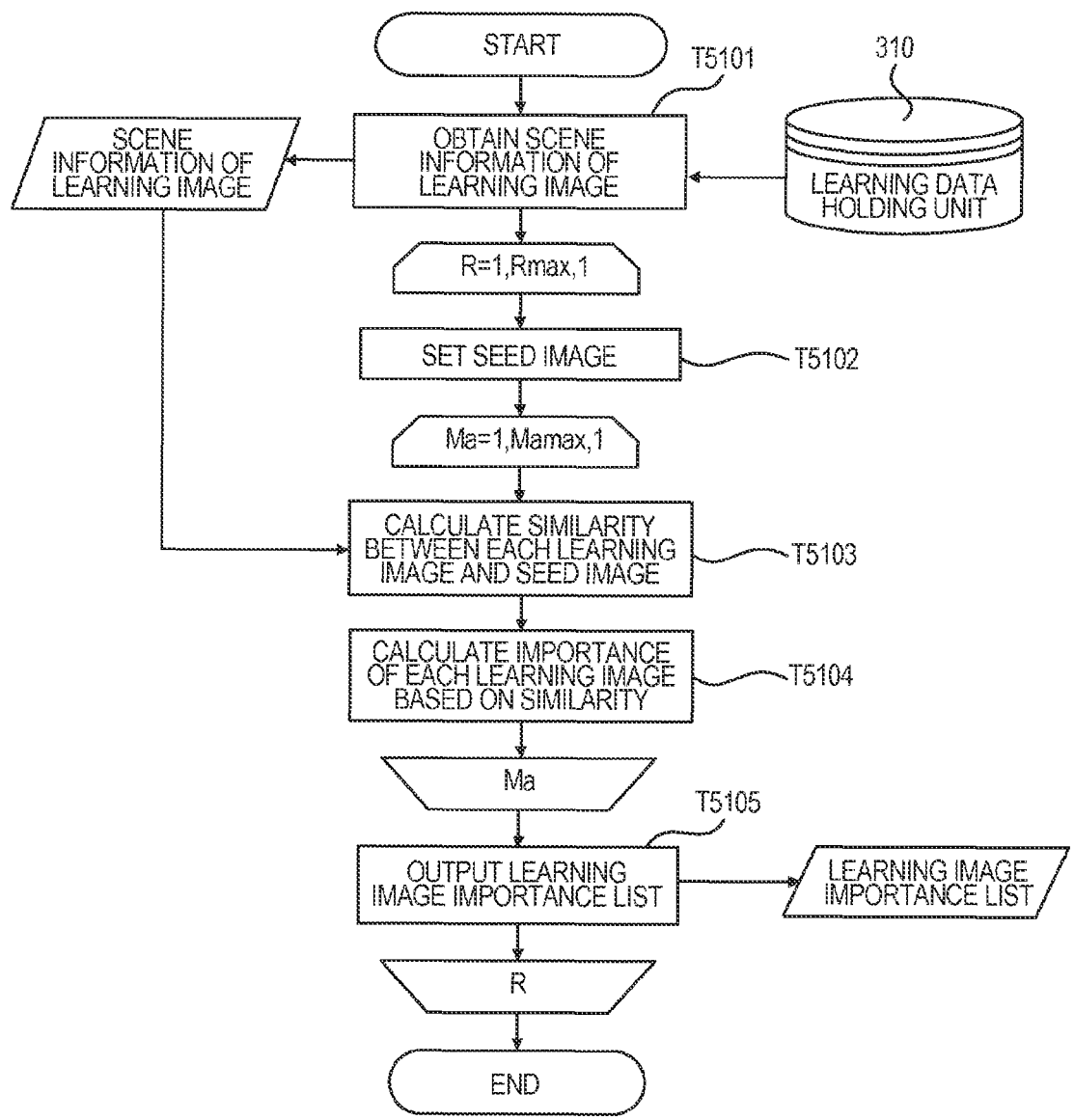
FIG. 23 is a flow chart indicating a learning image importance setting step in the fifth embodiment.

Next, a more specific process of the learning image importance setting step T510 in the fifth embodiment will be described. FIG. 23 is a detailed flow chart of the learning image importance setting step T510. A reference symbol "R" in FIG. 23 is an index indicating each of the area discriminators, and a reference symbol "Ma" represents an index of each of the learning images within the all learning data. Since a scene information obtaining step T5101 and a seed image setting step T5102 are the same as the respective corresponded steps T1101 and T1102 of the first embodiment, the description thereof will be omitted.

Figure 24:
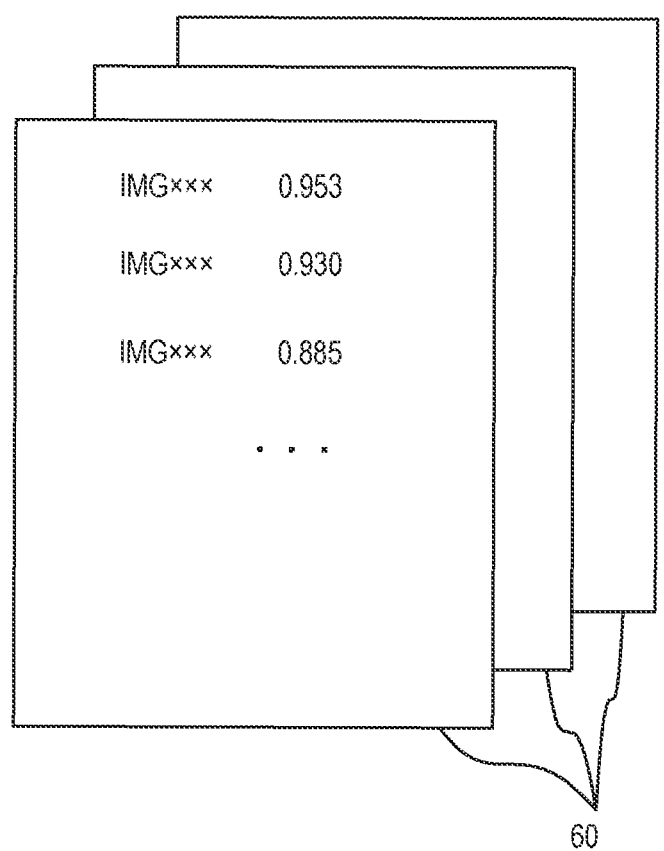
FIG. 24 is a diagram illustrating an example of an importance list to be used in the fifth embodiment.

When the flow advances to a process of a similarity calculating step T5103, the learning image importance setting unit 307 calculates the similarity between the seed image and the scene information for each of the learning images. As for the similarity, when utilizing the SPMK feature amount which was described in the first embodiment, the histogram distance or the like may be used. As for the similarity, anything other than the above is usable if it can calculate the distance between vectors. Next, when the flow advances to an importance calculating step T5104, the learning image importance setting unit 307 sets the importance of each of the learning images on the basis of the similarity which was calculated in the similarity calculating step T5103. As for the importance, lists 60 are created for each of the area discriminators as illustrated in FIG. 24, and the importance corresponding to each of the learning images is held in each of the lists 60. In an example of FIG. 24, the importance is normalized by values of "0" to "1". As for a calculation method of the importance, a function of calculating the importance may be defined by treating the similarity as parameters. In the fifth embodiment, a method of calculating the importance on the basis of the histogram distance will be described. For example, in the case of the histogram having a value range of "0" to "2", when the histogram distance is assumed as the $dist_{Im}$, the importance $\omega_{Im}$ each of the learning images is expressed as in the expression (5).

$$\omega_{Im} = (2 - dist_{Im})/2 \quad (5)$$

The learning image importance setting unit 307 performs the processes of the similarity calculating step T5103 and the importance calculating step T5104 for each of the learning images and outputs the learning image importance as a list, as a list outputting step T5105. The learning image importance, which was output, is utilized in the next integrated identifier learning step T540. Since the process at the time of performing the recognition in the integrated identifier learning step T540 is the same as that of the first embodiment, the description thereof will be omitted.

As described above, according to the fifth embodiment, the learning apparatus 300 sets the importance of the learning data to be learned at each of the area discriminators on the basis of the scene information and learns the plural area discriminators by using the learning data selected on the basis of the importance. In addition, the learning apparatus 300 learns the integrated identifier which identifies a class of each of the areas by integrating the area discrimination results obtained by the plural area discriminators with the scene information. Therefore, the image recognizing apparatus 20 of the fifth embodiment becomes to be able to identify a class of each of areas of the image to be identified accurately by performing the identification by integrating the area discrimination results obtained by the plural area discriminators with the scene information. Accordingly, the image recognizing apparatus 20 of the fifth embodiment can perform the area division and the image recognition with the high accuracy.

From the fact as described above, according to each of the embodiments, the image recognizing apparatus 20 can accurately identify a class related to classification of objects for each of areas of an image.

According to the present invention, a class related to classification of objects can be accurately identified for each of areas of each image also in various images having different shooting conditions (scenes) of images.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-234869, filed Nov. 19, 2014, which is hereby incorporated by reference herein in its entirety.

What is claimed is:

1. An image processing apparatus comprising:
a processor;
and a memory storing instructions which, when executed by the processor, cause the image processing apparatus to function as:
a creating unit configured to create a plurality of subsets, wherein each of the plurality of subsets is created by selecting, from a plurality of learning images, one or more learning images;
a learning unit configured to learn an area discriminator for discriminating a class of each area obtained by dividing the learning images, for each subset created by the creating unit;
a learning discriminating unit configured to discriminate a class of each area obtained by dividing a plurality of learning evaluation images, by using the plurality of area discriminators learned by the learning unit; and
an identification learning unit configured to learn an integrated identifier based on a discrimination result for each area of the plurality of learning evaluation images discriminated by the learning discriminating unit and scene information associated with each of the plurality of learning evaluation images.

2. The image processing apparatus according to claim 1, wherein
scene information is associated with each of the plurality of learning images, and
the creating unit creates the plurality of subsets based on the scene information of the plurality of learning images.

3. The image processing apparatus according to claim 2, wherein
the creating unit creates, based on the scene information of the learning image randomly selected from the plurality of learning images, the subset by selecting the learning image with which scene information similar to the scene information of the learning image selected from the plurality of learning images is associated.

4. The image processing apparatus according to claim 2, wherein
the creating unit creates, based on the scene information of the learning image selected from the plurality of learning images by an instruction of a user, the subset by selecting the learning image with which scene information similar to the scene information of the learning image selected from the plurality of learning images is associated.

5. The image processing apparatus according to claim 2, wherein
the creating unit performs clustering of the plurality of learning images based on similarity of the scene information, and creates a same subset by the learning images included in a cluster by the clustering.

6. The image processing apparatus according to claim 1, wherein
the plurality of learning evaluation images include a part or all of the plurality of learning images.

7. The image processing apparatus according to claim 2, wherein
the identification learning unit learns the integrated identifier based on similarity between the scene information of the plurality of learning images and the scene information of the plurality of learning evaluation images.

8. The image processing apparatus according to claim 1, wherein the instructions, when executed by the processor, further cause the image processing apparatus to function as:
a re-learning unit configured to re-learn the plurality of area discriminators according to accuracy of the discrimination result by the learning discriminating unit.

9. The image processing apparatus according to claim 1, wherein the instructions, when executed by the processor, further cause the image processing apparatus to function as:
an additional learning unit configured to additionally learn the area discriminator according to the discrimination result by the learning discriminating unit, wherein
the identification learning unit learns the integrated identifier based on a discrimination result of the area discriminator additionally learned by the additional learning unit.

10. The image processing apparatus according to claim 1, wherein
an importance is associated with each of the plurality of learning images, and
the creating unit creates the plurality of subsets based on the respective importances of the plurality of learning images.

11. The image processing apparatus according to claim 1, wherein the instructions, when executed by the processor, further cause the image processing apparatus to function as:
a holding unit configured to hold the plurality of area discriminators learned by the learning unit.

12. The image processing apparatus according to claim 1, wherein
the scene information includes a histogram of color information in a plurality of blocks obtained by dividing an image.

13. The image processing apparatus according to claim 1, wherein
the learning unit learns the area discriminator for discriminating the class of each area based on a feature amount extracted from each area of the learning image and accuracy data given to the each area.

14. The image processing apparatus according to claim 1, wherein
the identification learning unit learns the integrated identifier based on a feature amount constituted by the discrimination result and the scene information, and accuracy data given to each area of the plurality of learning evaluation images.

15. The image processing apparatus according to claim 1, wherein the instructions, when executed by the processor, further cause the image processing apparatus to function as:
an obtaining unit configured to an image to be identified;
a scene information obtaining unit configured to obtain scene information of the image to be identified;
a discriminating unit configured to discriminate a class of each area obtained by dividing the image to be identified, by using the plurality of area discriminators learned by the learning unit; and
an integrated identifying unit configured to identify, by using the learned integrated identifier, the class of each area of the image to be identified, based on a discrimination result for each area of the plurality of images to be identified discriminated by the discriminating unit and the obtained scene information.

16. An image processing method comprising:
creating a plurality of subsets, wherein each of the plurality of subsets is created by selecting, from a plurality of learning images, one or more learning images;
learning an area discriminator for discriminating a class of each area obtained by dividing the learning images, for each of the created subsets;
discriminating a class of each area obtained by dividing a plurality of learning evaluation images, by using the plurality of learned area discriminators; and
learning an integrated identifier based on a discrimination result for each area of the plurality of discriminated learning evaluation images and scene information associated with each of the plurality of learning evaluation images.

17. A non-transitory computer-readable recording medium that stores a program for causing a computer to function as the units of an image processing apparatus comprising:
a creating unit configured to create a plurality of subsets, wherein each of the plurality of subsets is created by selecting, from a plurality of learning images, one or more learning images;
a learning unit configured to learn an area discriminator for discriminating a class of each area obtained by dividing the learning images, for each subset created by the creating unit;
a learning discriminating unit configured to discriminate a class of each area obtained by dividing a plurality of learning evaluation images, by using the plurality of area discriminators learned by the learning unit; and
an identification learning unit configured to learn an integrated identifier based on a discrimination result for each area of the plurality of learning evaluation images discriminated by the learning discriminating unit and scene information associated with each of the plurality of learning evaluation images.

\* \* \* \* \*